US012157646B2

(12) United States Patent
Thiessen

(10) Patent No.: US 12,157,646 B2
(45) Date of Patent: Dec. 3, 2024

(54) STORAGE SILO APPARATUS WITH AN INTEGRATED VERTICAL CONVEYOR

(71) Applicant: JDL CANADA INC., Winkler (CA)

(72) Inventor: Lonny James Thiessen, Winkler (CA)

(73) Assignee: JDL Canada Inc., Winkler (CA)

( * ) Notice: Subject to any disclaimer, the term of this patent is extended or adjusted under 35 U.S.C. 154(b) by 261 days.

(21) Appl. No.: 17/862,649

(22) Filed: Jul. 12, 2022

(65) Prior Publication Data

US 2023/0013683 A1    Jan. 19, 2023

Related U.S. Application Data

(60) Provisional application No. 63/221,598, filed on Jul. 14, 2021.

(51) Int. Cl.
| | | |
|---|---|---|
| *B65G 65/32* | (2006.01) | |
| *B65D 88/26* | (2006.01) | |
| *B65G 65/06* | (2006.01) | |
| *B65G 65/42* | (2006.01) | |

(52) U.S. Cl.
CPC ............. *B65G 65/42* (2013.01); *B65D 88/26* (2013.01); *B65G 65/06* (2013.01); *B65G 2201/04* (2013.01)

(58) Field of Classification Search
CPC ................................. B65G 65/32; B65D 88/32
See application file for complete search history.

(56) References Cited

U.S. PATENT DOCUMENTS

| | | | | | |
|---|---|---|---|---|---|
| 2,618,374 | A | * | 11/1952 | Rahlson | B65G 63/008 |
| | | | | | 198/569 |
| 3,314,557 | A | * | 4/1967 | Sackett, Sr. | B28C 9/00 |
| | | | | | 366/186 |
| 9,260,257 | B2 | * | 2/2016 | Stegemoeller | B65G 63/008 |
| 9,752,389 | B2 | * | 9/2017 | Pham | E21B 15/00 |
| 9,776,813 | B2 | * | 10/2017 | McMahon | B65G 63/008 |
| 10,059,535 | B2 | * | 8/2018 | Herman | B65G 41/008 |
| 10,633,174 | B2 | * | 4/2020 | Pham | B65D 88/54 |

* cited by examiner

*Primary Examiner* — Jonathan Snelting
(74) *Attorney, Agent, or Firm* — Ryan W. Dupuis; Michael R. Williams; Ade & Company Inc.

(57) ABSTRACT

A secondary silo on a second portable frame is independently portable relative to a primary silo and a vertical conveyor on a first portable frame. The vertical conveyor conveys flowable proppant material from an intake hopper below the primary silo into either one of the silos. The silos have gravity discharge chutes that are gravity fed directly into a proppant blender unit. An unloader on wheels is self-propelled and steerable relative to the silos. The unloader can be lowered relative to the wheels to sit on the ground to allow vehicles to drive over the unloader for discharge. Intake hoppers of the unloader can be raised up against the vehicle to form a closed duct discharging from the vehicles into the unloader. A discharge of the unloader forms a closed passage with the intake hopper of the vertical conveyor.

15 Claims, 17 Drawing Sheets

STORAGE SILO APPARATUS WITH AN INTEGRATED VERTICAL CONVEYOR

This application claims the benefit under 35 U.S.C. 119(e) of U.S. provisional application Ser. No. 63/221,598, filed Jul. 14, 2021.

FIELD OF THE INVENTION

The present invention relates to a storage system for flowable particulate materials including a storage silo supported on a transportable base frame together with a vertical conveyor for loading the storage silo and/or a truck unloader for transferring flowable particulate material from a transport truck into the vertical conveyor of the storage silo or another storage apparatus.

BACKGROUND

In a hydraulic fracturing operation in the oil and gas industry, a fracturing fluid including granular materials such as sand, known as proppant, is pumped into a well to create and prop open fractures in the ground. Hydraulic fracturing operations are commonly performed in remote locations, require large amounts of granular material to be readily available on demand, and may occur over a limited time period. Accordingly, while it is desirable to have storage facilities readily available at these remote locations which are capable of storing the large amounts of granular material, it is desirable for the storage facilities to be readily portable for transport between different oilfield sites. A similar need for storage facilities which accommodate large volumes of flowable materials which being readily portable also exists in industrial, agricultural and other applications.

SUMMARY OF THE INVENTION

According to one aspect of the invention there is provided a storage silo apparatus for flowable material, the apparatus comprising:
  a base frame;
  a storage silo supported above the base frame;
  a vertical conveyor mounted on the storage silo;
  the vertical conveyor being arranged to convey the flowable material from an intake hopper of the vertical conveyor below the storage silo to a discharge arrangement of the vertical conveyor; and
  the discharge arrangement of the vertical conveyor being operable in a first configuration discharging the flowable material into the storage silo and in a second configuration discharging the flowable material externally of the storage silo.

The configuration of the discharge arrangement being operable to discharge either into the silo or externally of the silo allows the storage silo to function as a primary silo that can also fill an adjacent secondary silo for doubling the storage capacity associated with a single vertical conveyor.

The discharge arrangement is preferably located above the storage silo in both the first and second configurations. The discharge arrangement may comprises (i) an outlet duct receiving material from the vertical conveyor, (ii) a first discharge duct in communication with the storage silo, (iii) a second discharge duct directed externally of the storage silo, and (iv) a gate operable between a first position directing the outlet duct to communicate with the first discharge duct according to the first configuration of the discharge assembly and a second position directing the outlet duct to communicate with the second discharge duct according to the second configuration of the discharge assembly.

Preferably the discharge gate is situated above the storage silo within a perimeter boundary defined by upright perimeters walls of the storage silo.

The intake hopper of the vertical conveyor is preferably situated within a perimeter boundary defined by upright perimeters walls of the storage silo.

The vertical conveyor preferably comprises a bucket elevator operable within an elevator housing in which the intake hopper communicates with the elevator housing through a restricted opening, the restricted opening being sized and positioned relative to the elevator housing so as to prevent overfilling of material gravity fed into the elevator housing from the intake hopper beyond a loading capacity of the bucket elevator.

The apparatus may further comprise: (i) a hopper bottom forming a bottom end of the storage silo in which the hopper bottom tapers downwardly towards a bottom discharge at a bottom end of the hopper bottom through which the storage silo is arranged to be selectively discharged; and (ii) a secondary discharge in communication with an interior of the storage silo at a location spaced above the bottom discharge through which the storage silo is arranged to be selectively discharged.

When the vertical conveyor comprises a bucket elevator operable within an elevator housing, the apparatus may further comprise a pneumatic conveying tube extending alongside the storage silo from a pneumatic intake adjacent a bottom end of the storage silo to a pneumatic intake in communication with an interior of the storage silo adjacent a top end of the storage silo.

The apparatus may further comprise a secondary silo supported on a respective base frame, in which the secondary silo and the primary storage silo locating the vertical conveyor therein are transportable independently of one another. The discharge arrangement of the vertical conveyor preferably discharging the flowable material into the secondary silo in the second configuration.

When a secondary silo is also provided, the apparatus may further comprise a coupling mat operatively connecting the base frame of the storage silo to the base frame of the secondary while each of the base frames remains engaged directly upon a supporting ground surface, in which the coupling mat includes (i) a first docking station releasably locating the base frame of the storage silo relative to the coupling mat and (ii) a second docking station releasably locating the base frame of the secondary silo relative to the coupling mat such that the base frame of the storage silo and the base frame of the secondary silo are spaced apart from one another.

When used with a proppant blender unit having a blender intake hopper, the apparatus may further comprise (i) a hopper bottom forming a bottom end of the storage silo in which the hopper bottom tapers downwardly towards a bottom discharge at a bottom end of the hopper bottom through which the storage silo is arranged to be selectively discharged, and (ii) an enclosed discharge duct in open communication with the bottom discharge, in which the enclosed discharge duct extends from the bottom discharge to the blender intake hopper at a downward slope so as to be arranged to discharge material from the storage silo to the blender intake hopper through the enclosed discharge duct by gravity alone. Preferably the bottom end of the enclosed discharge duct is in open communication with the blender intake hopper at a location below an upper storage boundary of the blender intake hopper, in which the upper storage boundary is defined as an upper boundary of material piled at an angle of repose at a maximum fill height within the blender intake hopper.

When the apparatus further includes a secondary silo supported on a respective base frame for receiving material from the vertical conveyor in the second configuration and including an enclosed discharge duct in open communication with the bottom discharge of the secondary silo, preferably the discharge capacity of the enclosed discharge ducts of the storage silo and the secondary silo collectively are greater than an intake rate of the blender intake hopper.

The apparatus may be used in combination with a drive-over unloader for unloading particulate material from a truck having storage compartment and a belly discharge on the storage compartment associated therewith, the drive-over unloader comprising (i) a portable frame including a drive-over portion arranged to support a portion of the truck thereon and a discharge portion which is elevated relative to the drive-over portion, (ii) at least one unloader intake hopper supported on the drive-over portion arranged to receive materials discharged from the belly discharge of the truck; and (iii) an unloader conveyor supported on the portable frame to convey material from said at least one unloader intake hopper to the discharge portion. Preferably the discharge portion includes an unloader discharge duct receiving conveyed material from the unloader conveyor, the unloader discharge duct being in communication with the intake hopper of the vertical conveyor so as to form a closed passage between the unloader and the vertical conveyor, whereby a flow of the conveyed material from the unloader to the vertical conveyor is fully enclosed.

According to a second aspect of the present invention there is provided a drive-over unloader for unloading particulate material from a truck having storage compartment and a belly discharge on the storage compartment associated therewith, the drive-over unloader comprising:

a portable frame including a drive-over portion arranged to support a portion of the truck thereon and a discharge portion which is elevated relative to the drive-over portion;

at least one unloader intake hopper supported on the drive-over portion arranged to receive materials discharged from the belly discharge of the truck; and an unloader conveyor supported on the portable frame to convey material from said at least one unloader intake hopper to the discharge portion.

Preferably said at least one unloader intake hopper includes a collar defining an upper rim of the unloader intake hopper, the collar being adjustable in height relative to the portable frame between (i) a lowered position in which passage of the truck over the unloader intake hopper is unobstructed by the collar and (ii) a raised position in which the collar is arranged to abut the belly discharge of the truck.

The unloader may further comprise (i) an unloader housing fully enclosing the unloader conveyor between said at least one unloader intake hopper and the discharge portion, (ii) an exhaust fan operatively connected to the unloader housing so as to maintain the unloader housing at a negative pressure, and (iii) a dust collector operatively associated with the exhaust fan.

The unloader may further comprise: (i) the unloader conveyor of the drive-over unloader comprising an endless belt conveyor including an upper run for conveying material thereon and a lower run, (ii) the discharge portion of the drive-over unloader including a collector below a discharge end of the unloader conveyor arranged to receive conveyed material from the unloader conveyor, and (iii) a beater member rotatably supported on the unloader housing so as to be arranged to impact the lower run of the unloader conveyor at a location above the collector.

The unloader may further comprise: (i) a pair of transport wheels on the portable frame so as to be arranged to support a first portion of the portable frame for rolling movement along the ground, (ii) a drive wheel coupled to the portable frame by a linkage enabling the drive wheel to be controllable adjusted in height relative to the portable frame between a working position in which the drive wheel is raised relative to the portable frame and a transport position in which the drive wheel supports a second portion of the portable frame for rolling movement along the ground, (iii) the drive wheel being controllably steerable relative to linkage about an upright steering axis in the transport position, and (iv) the drive wheel including a drive motor operatively connected thereto so as to drive rotation of the drive wheel and propel the portable frame relative to the ground in the transport position.

According to another aspect of the present invention there is provided a method of handling feeding flowable proppant material into a blender unit, the method comprising:

providing a primary silo and a secondary silo at a storage site, in which each of the primary silo and the secondary silo are supported on respective base frames which are independently portable, and in which a vertical conveyor is integrally supported on the base frame of the primary silo;

transporting the proppant material to a storage site using a transport vehicle having a bottom discharge;

transferring the proppant material from the transport vehicle to a vertical conveyor intake of the vertical conveyor using an unloader in which the unloader comprises (i) an unloader conveyor, (ii) an unloader intake forming a closed passage between the bottom discharge of the transport vehicle and the unloader conveyor, and (iii) a discharge duct forming a closed duct between the unloader conveyor and the vertical conveyor intake;

discharging the proppant material from the vertical conveyor into the primary silo and the secondary silo; and transferring the proppant material from the primary silo and the secondary silo into a blender intake hopper of the blender unit using respective closed discharge chutes feeding into the blender intake hopper under force of gravity alone.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
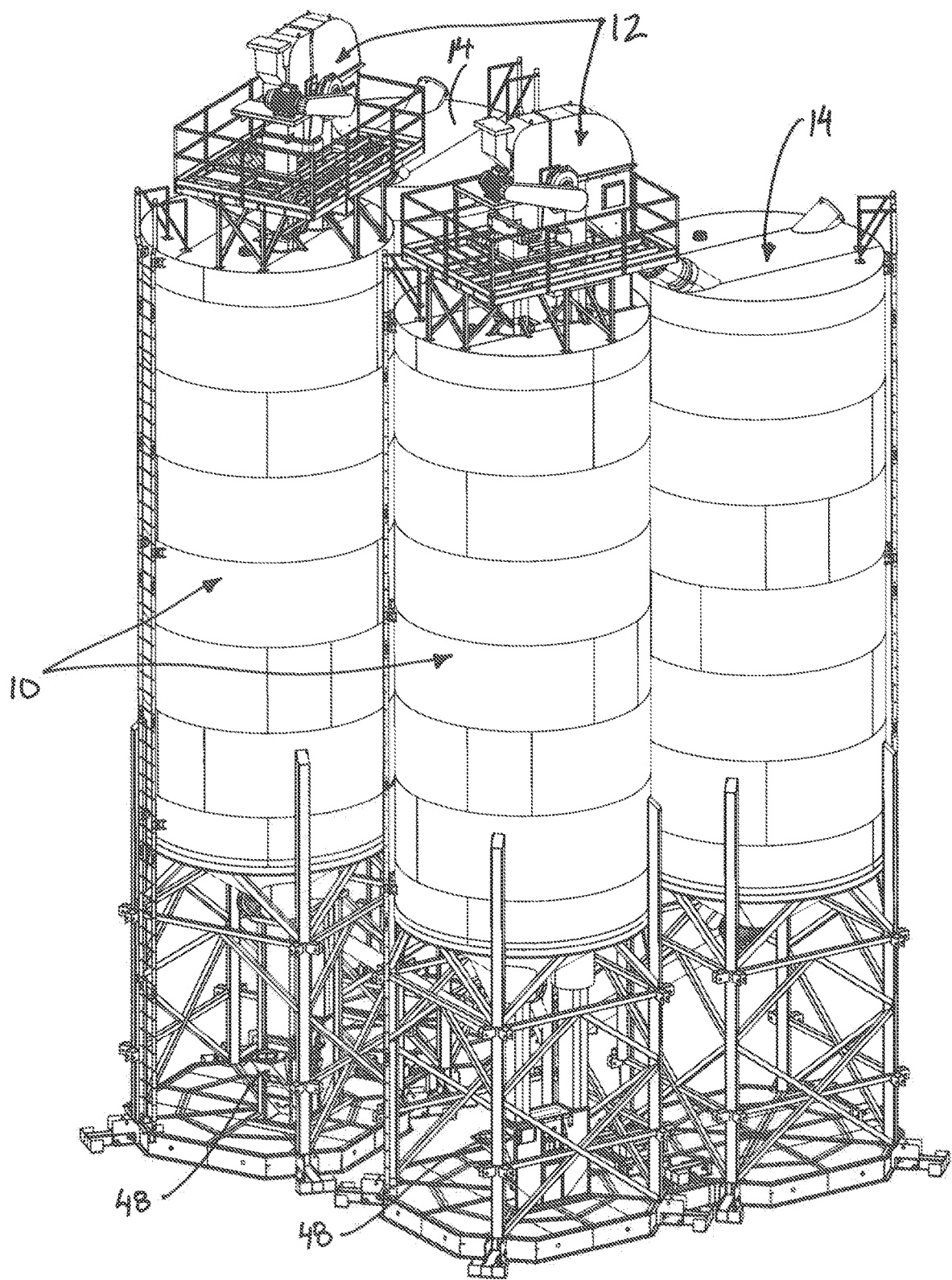
FIG. 1 is a perspective view of a storage silo apparatus according to the present invention.
Figure 2:
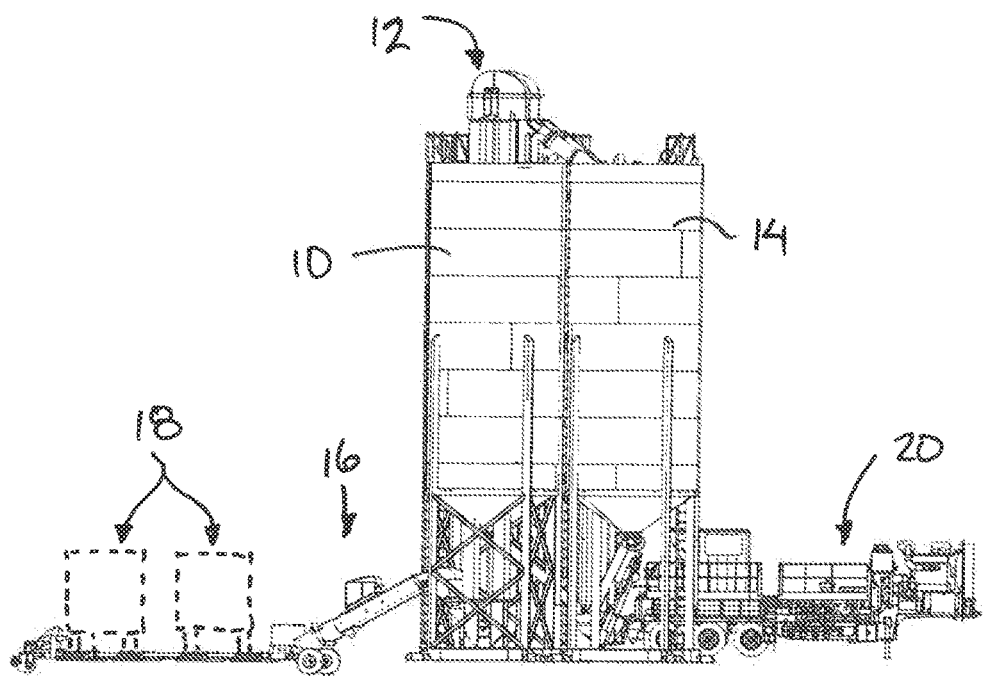
FIG. 2 is a side view of the storage silo apparatus according to FIG. 1 shown in use with a drive-over unloader for receiving material transferred from transport vehicles and dispensing material into a fracturing operations blender unit.
Figure 3:
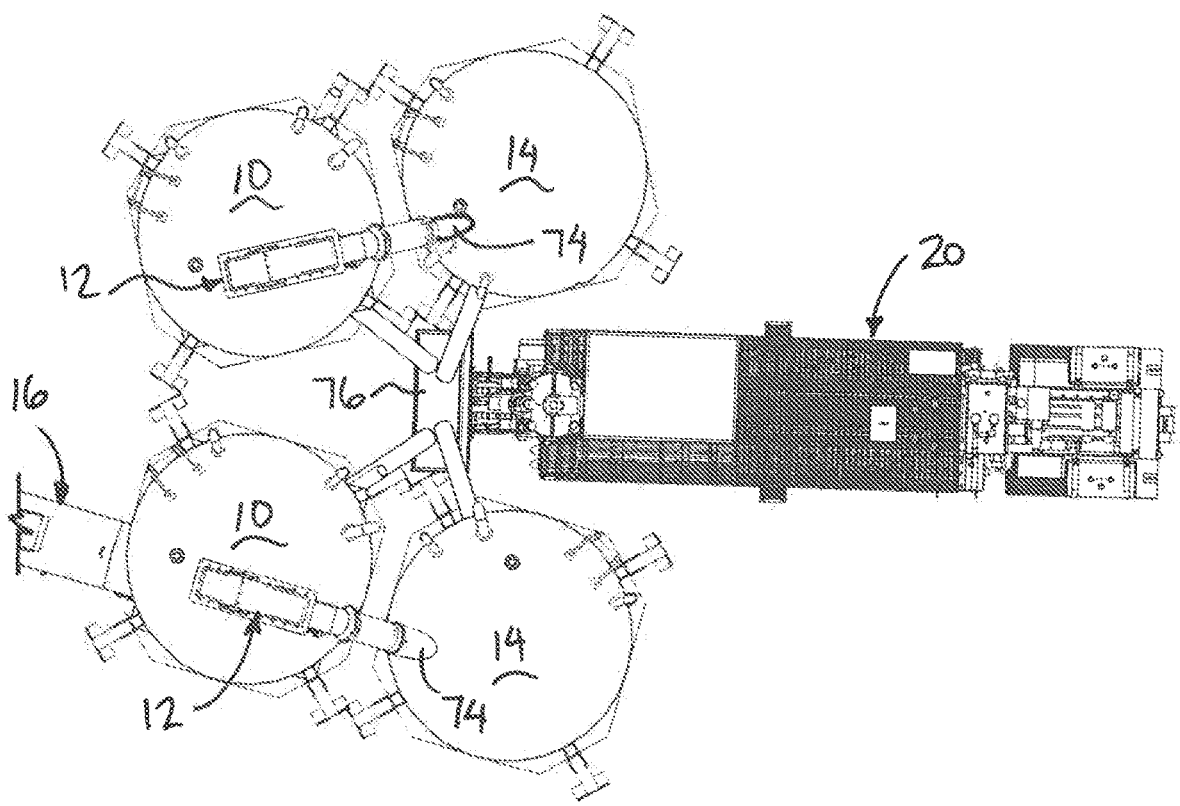
FIG. 3 is a top view of the storage silo apparatus according to FIG. 1 shown with the drive-over unloader and the blender unit.
Figure 4:
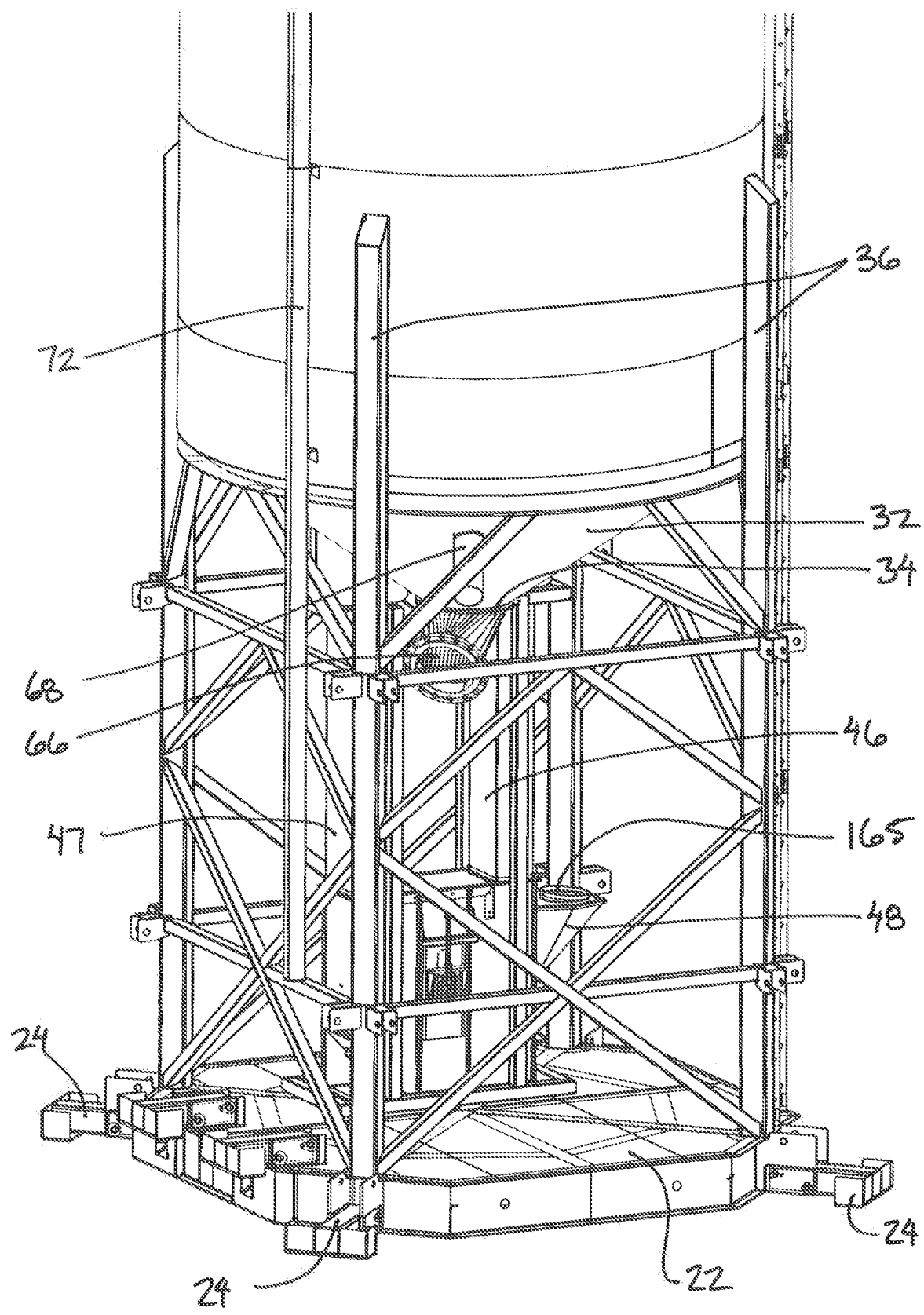
FIG. 4 is a perspective view of a lower portion of one of the primary storage silos of the apparatus according to FIG. 1.
Figure 5:
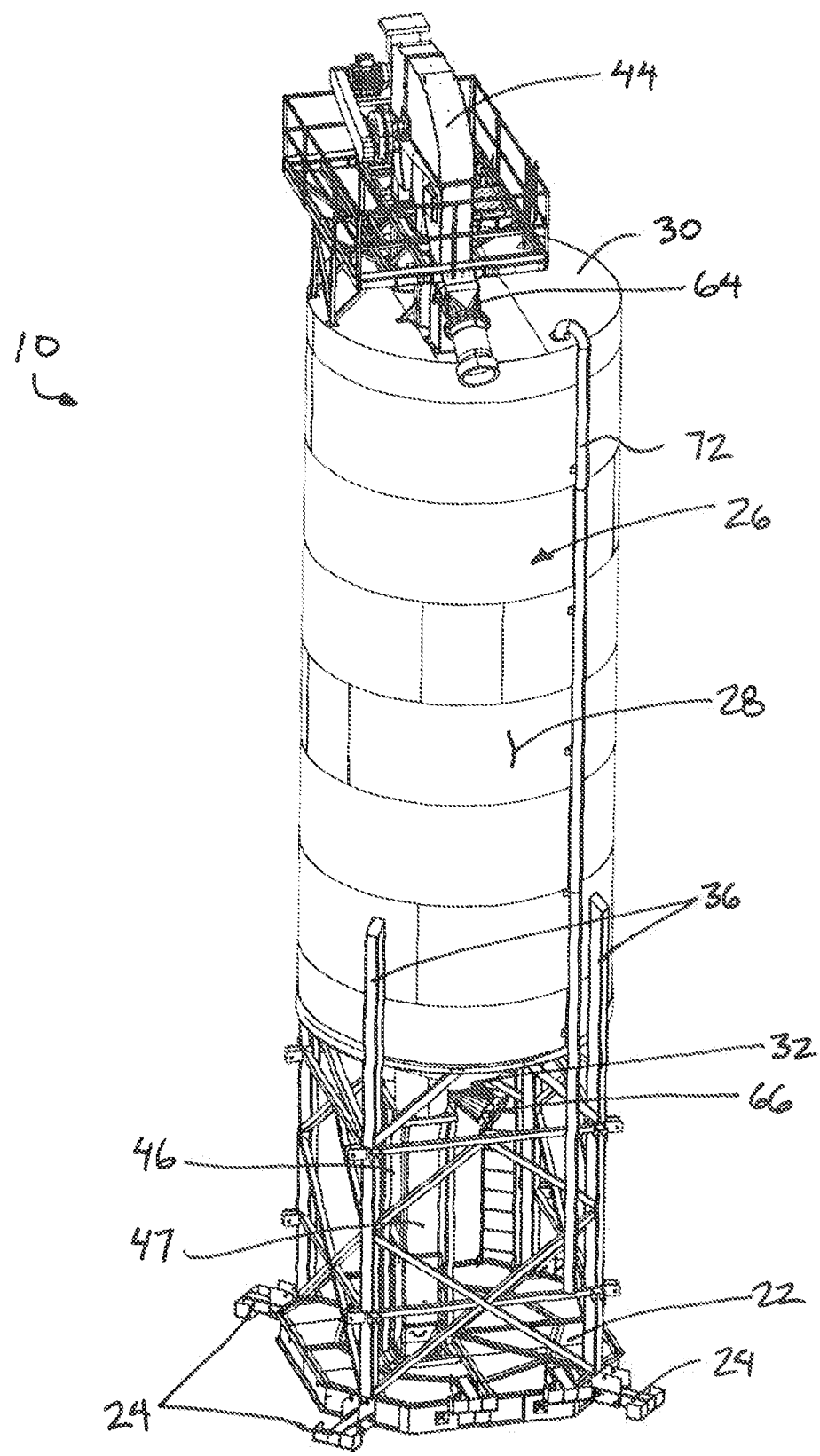
FIG. 5 is another perspective view of one of the primary storage silos of the apparatus according to FIG. 1.
Figure 6:
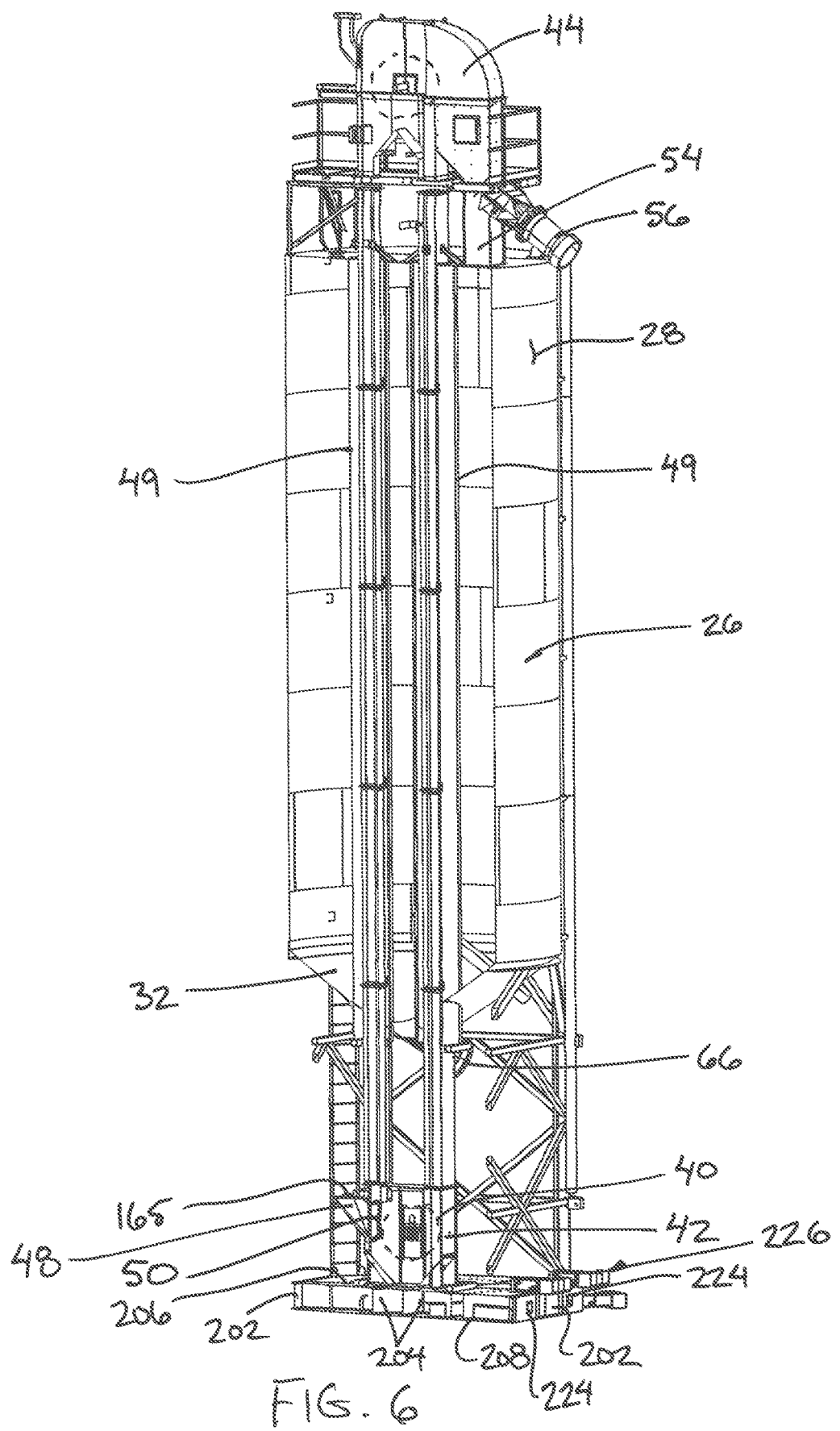
FIG. 6 is a partly sectional view of the primary storage silo of the storage silo apparatus according to FIG. 1.
Figure 7:
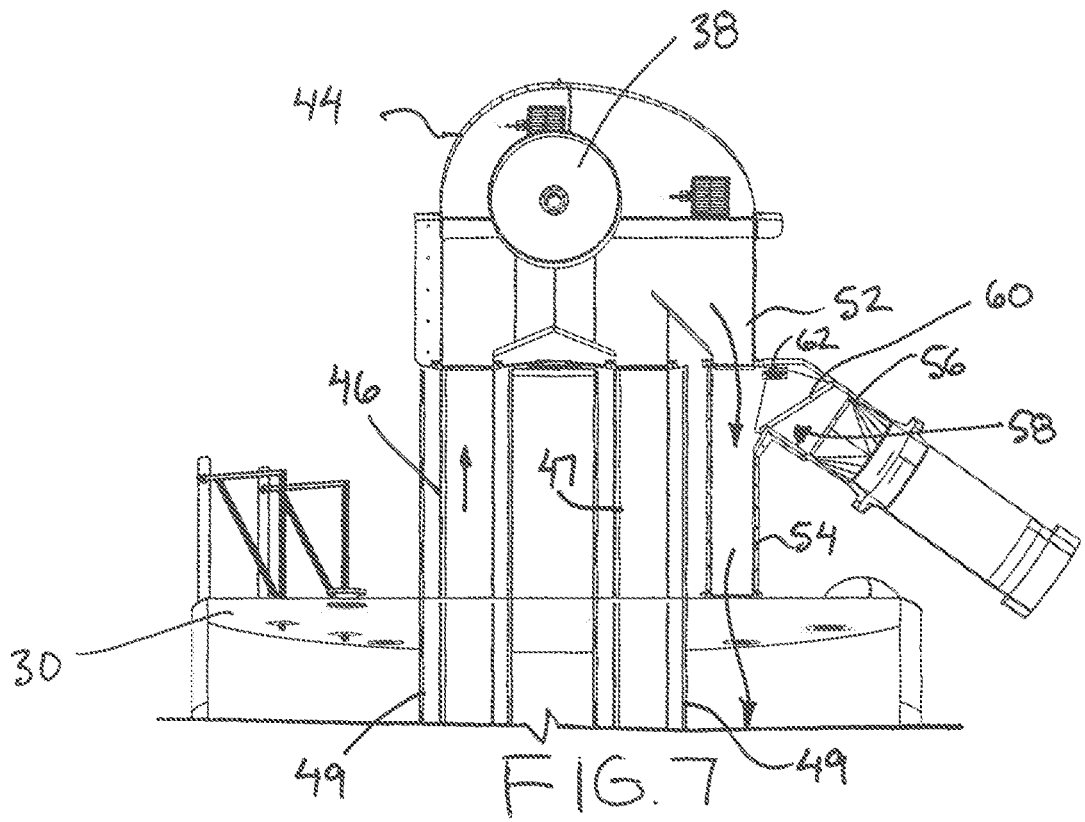
FIG. 7 is a partly sectional view of an upper portion of the primary storage silo of the storage silo apparatus according to FIG. 1, shown in a first discharge configuration.
Figure 8:
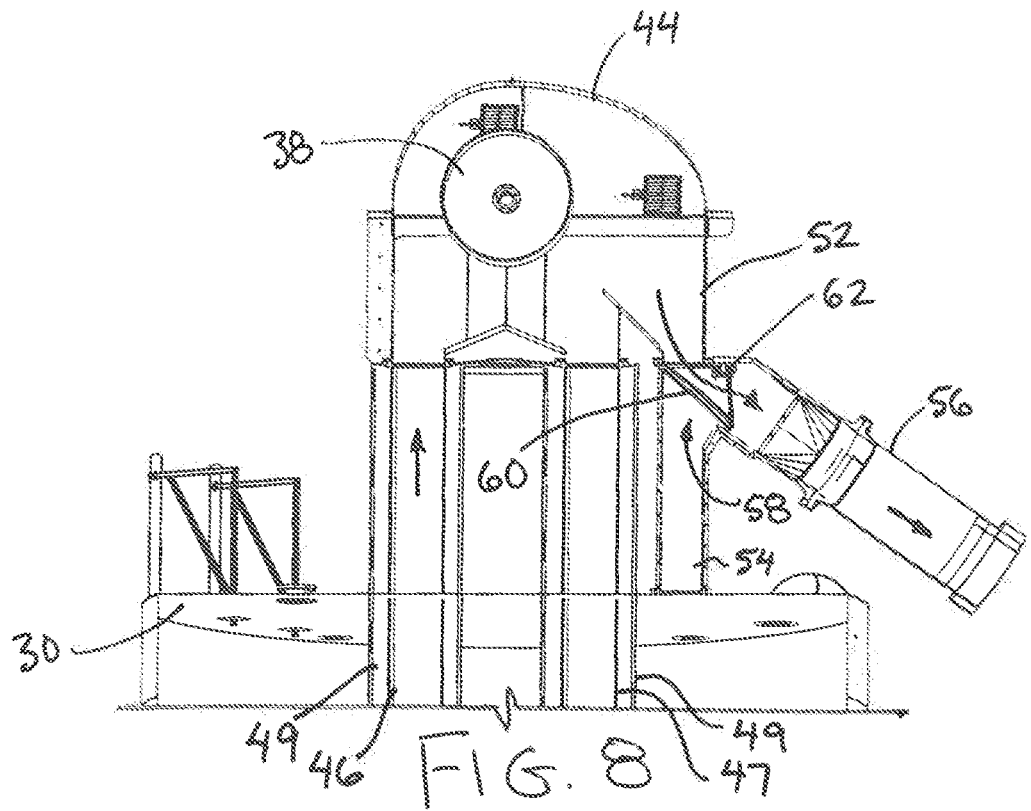
FIG. 8 is a partly sectional view of the upper portion of the primary storage silo of the storage silo apparatus according to FIG. 1, shown in a second discharge configuration.
Figure 9:
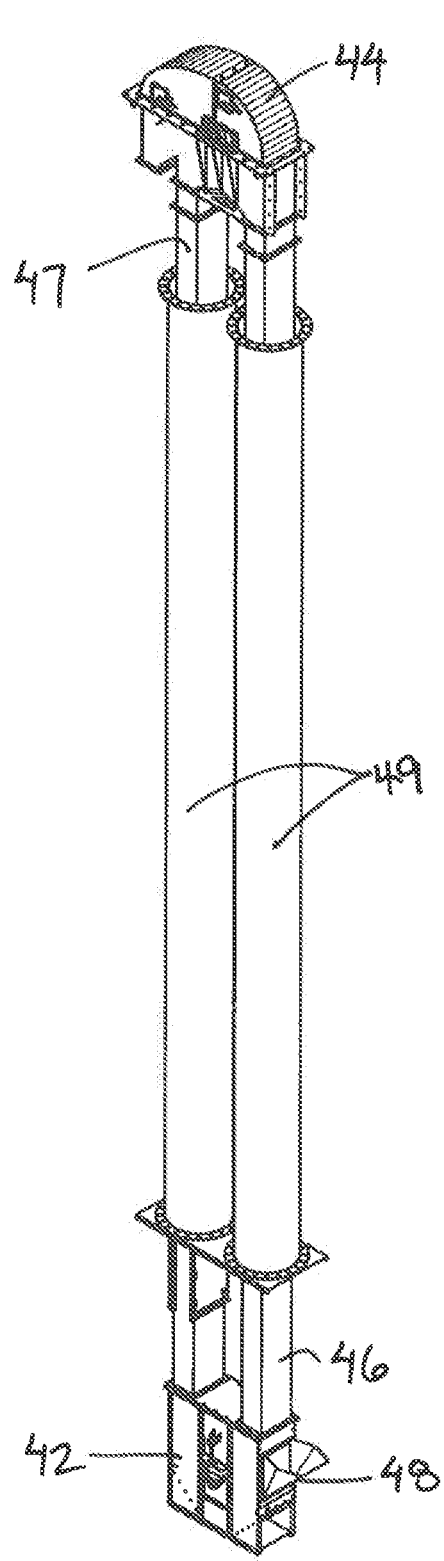
FIG. 9 is a perspective view of the vertical conveyor extending through tubular passages of the primary storage silo, but with the primary storage silo removed for illustrative purposes.
Figure 10:
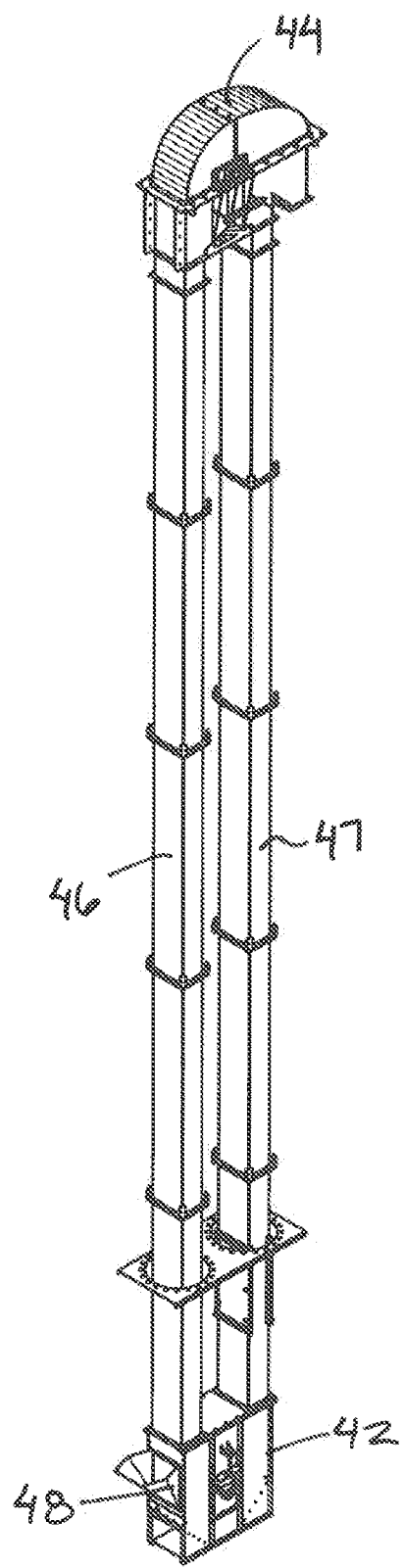
FIG. 10 is another perspective view of the vertical conveyor shown removed from the tubular passages of the primary storage silo.
Figure 11:
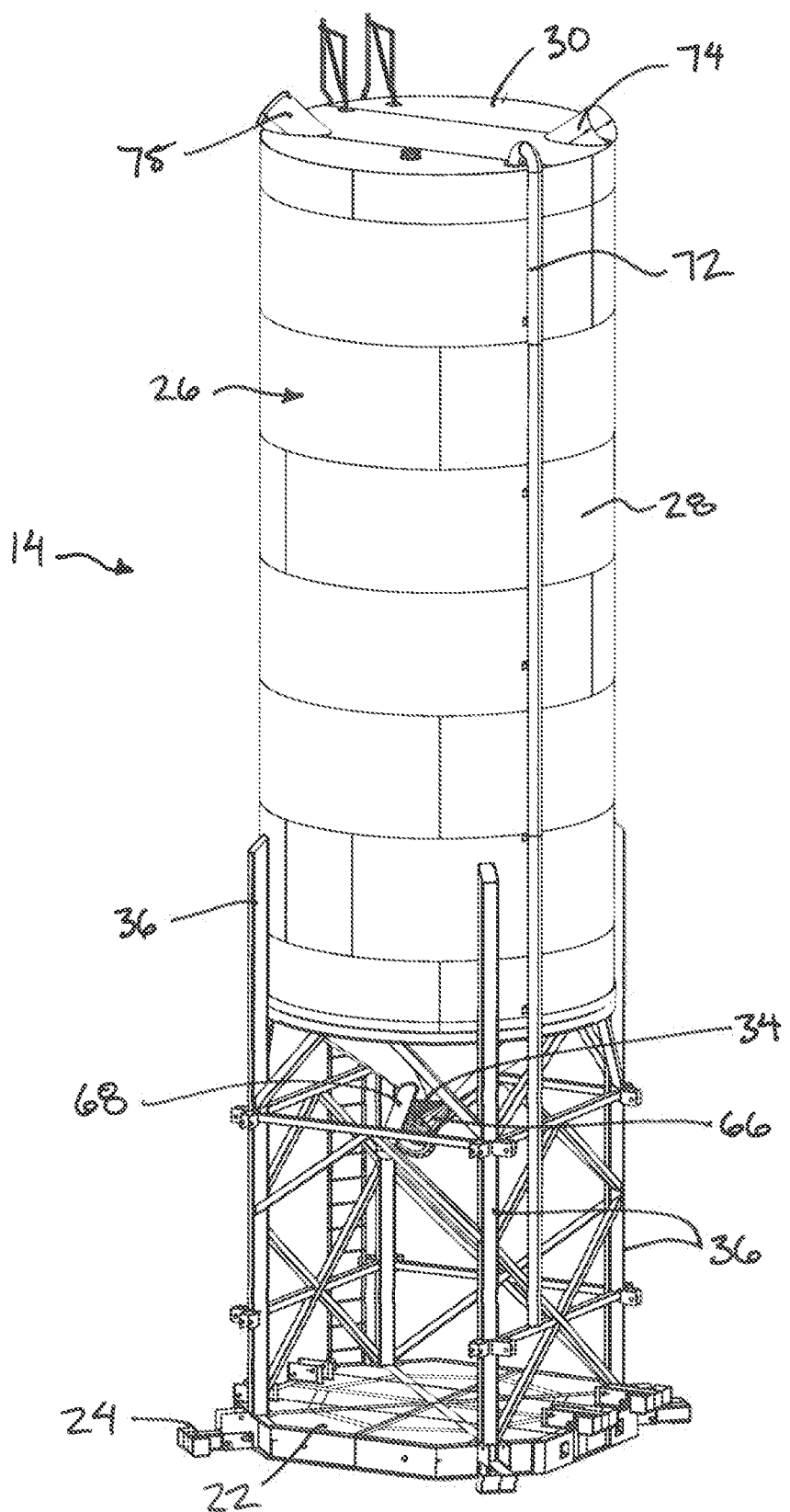
FIG. 11 is a perspective view of the secondary storage silo of the storage silo apparatus according to FIG. 1.
Figure 12:
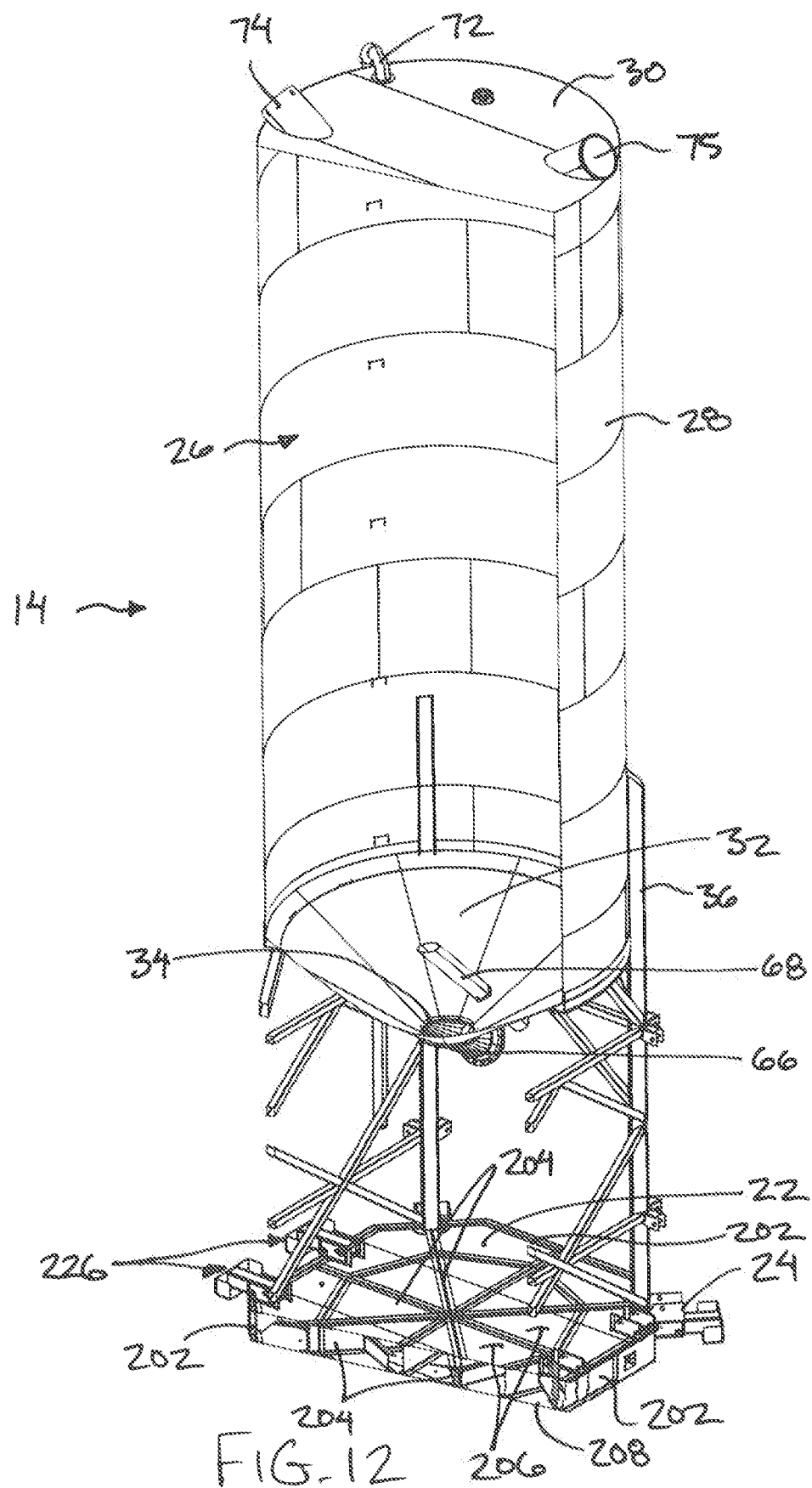
FIG. 12 is a partly sectional view of the secondary storage silo of the storage silo apparatus according to FIG. 1.
Figure 13:
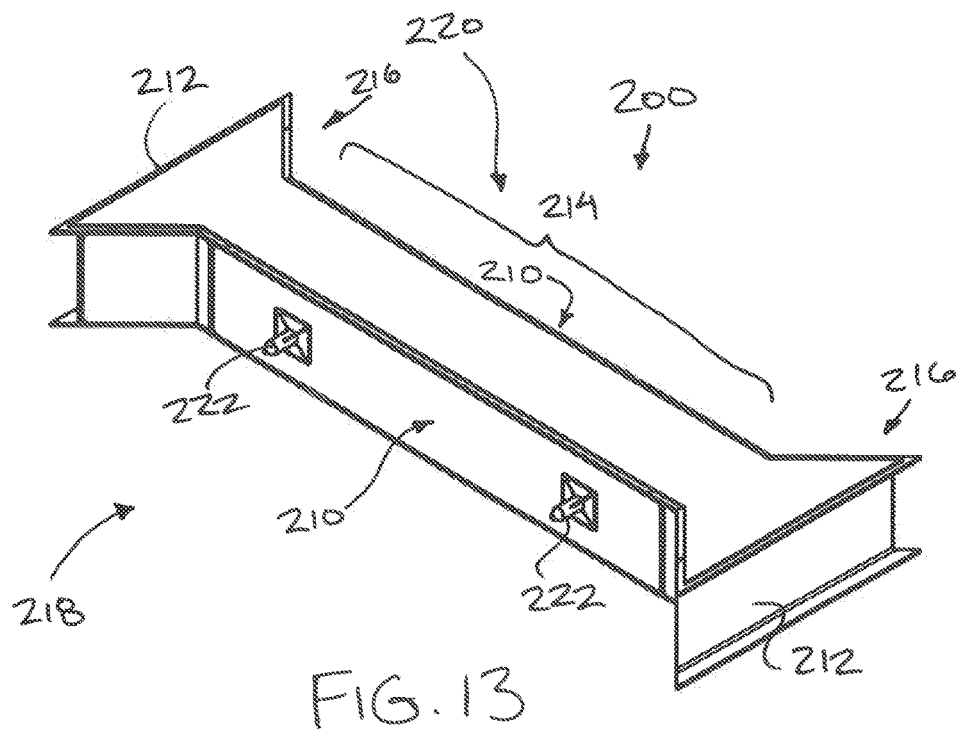
FIG. 13 is a perspective view of a coupling mat for coupling the primary storage silo and the secondary storage silo in the storage silo apparatus according to FIG. 1.
Figure 14:
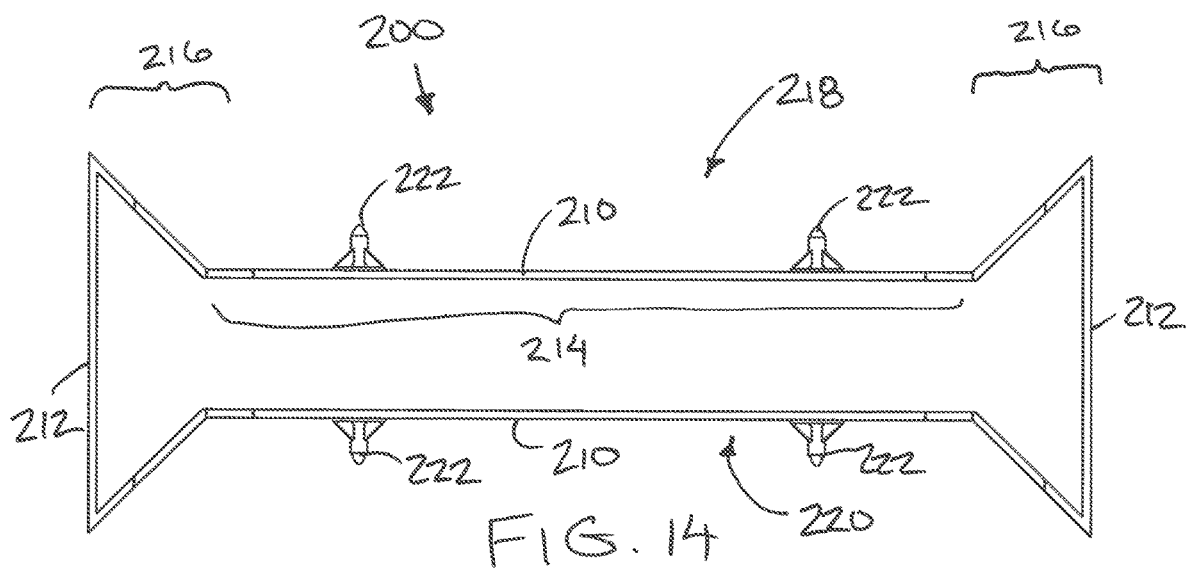
FIG. 14 is a top plan view of the coupling mat of FIG. 13.
Figure 15:
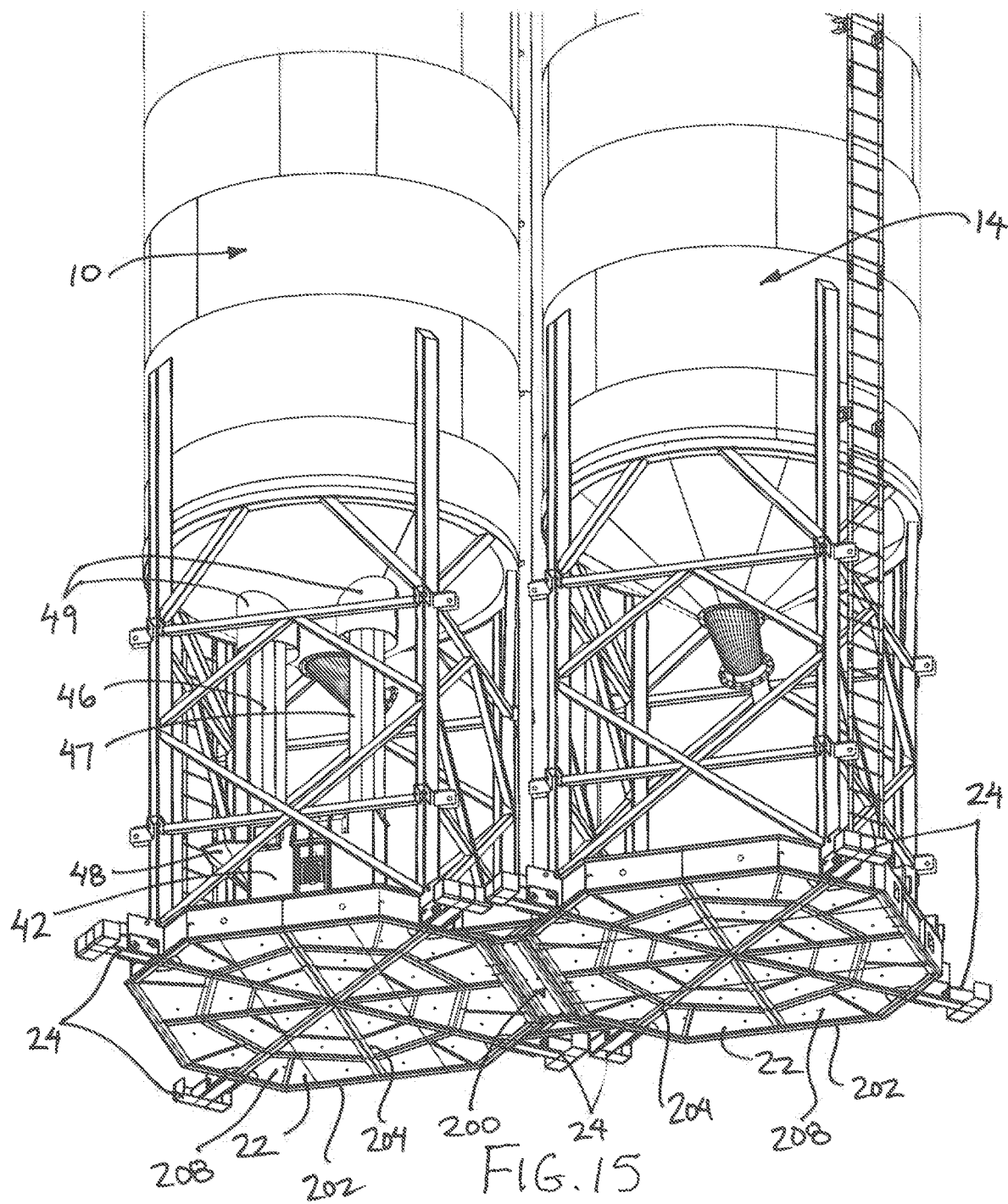
FIG. 15 is a perspective view of a bottom side of the coupling mat shown coupling the primary storage silo and the secondary storage silo in the storage silo apparatus according to FIG. 1.
Figure 16:
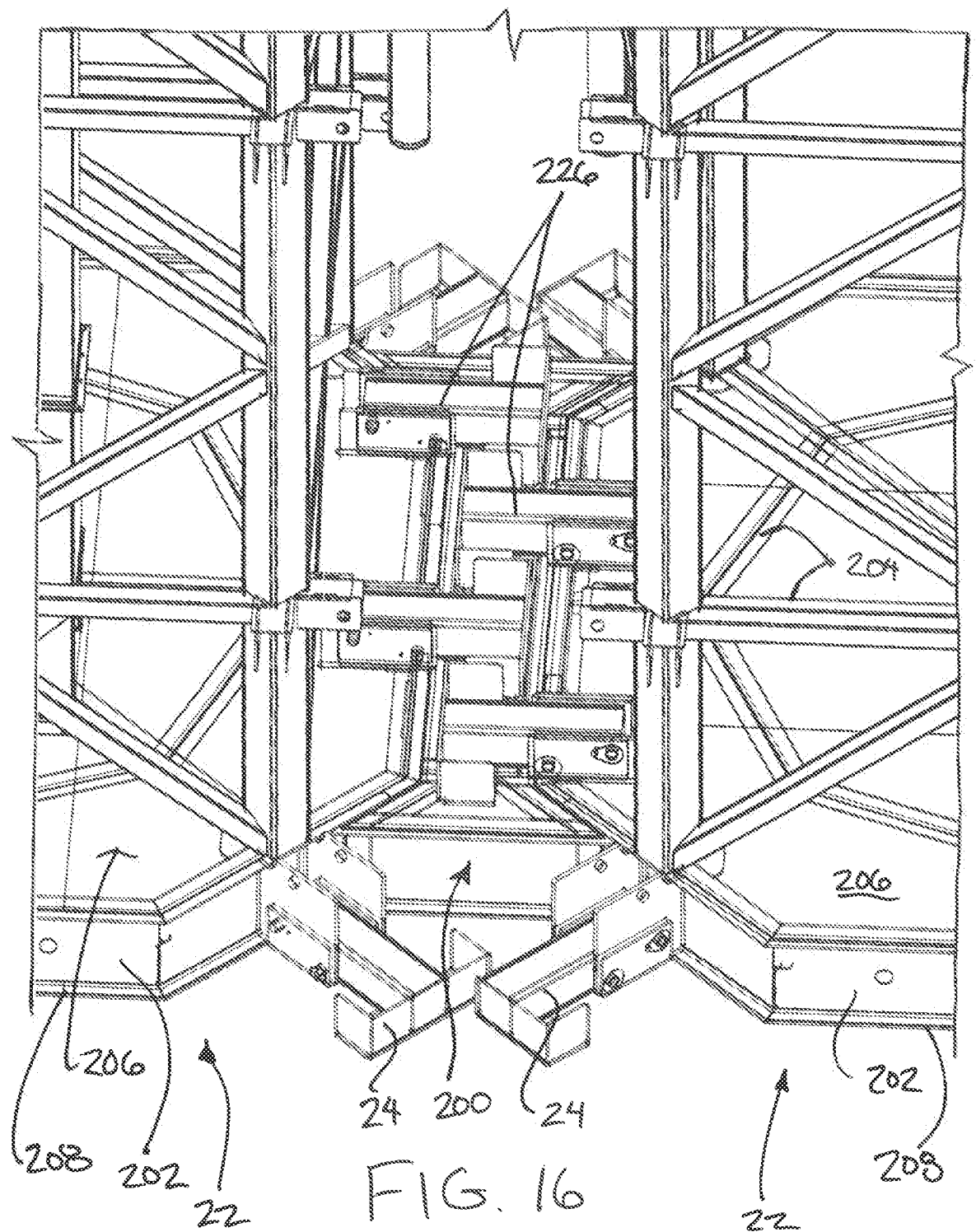
FIG. 16 is a perspective view of a top side of the coupling mat shown coupling the primary storage silo and the secondary storage silo in the storage silo apparatus according to FIG. 1.
Figure 17:
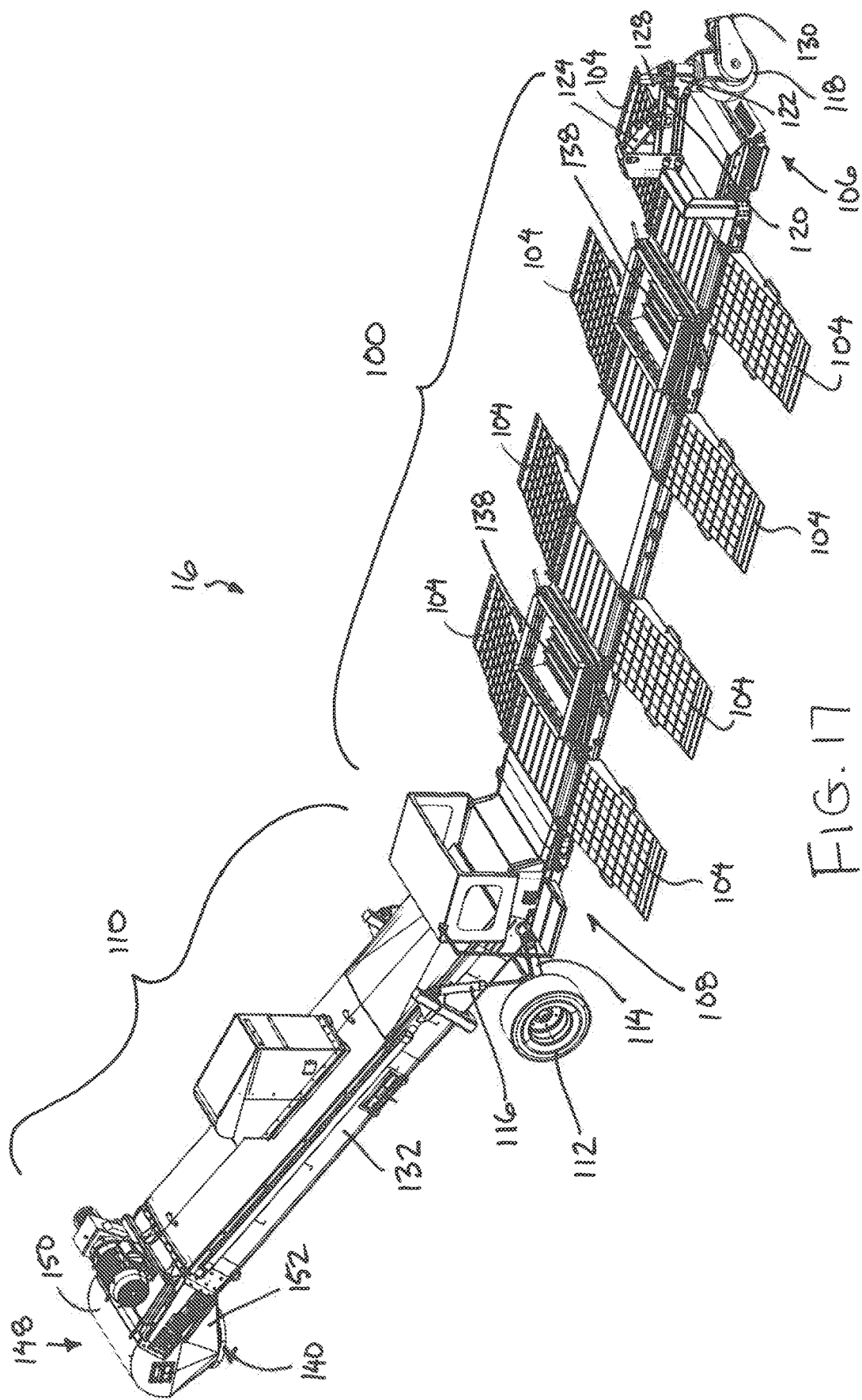
FIG. 17 is a perspective view of the drive-over unloader for use with the storage silo apparatus according to FIG. 1 with the drive wheel shown in a working position.
Figure 18:
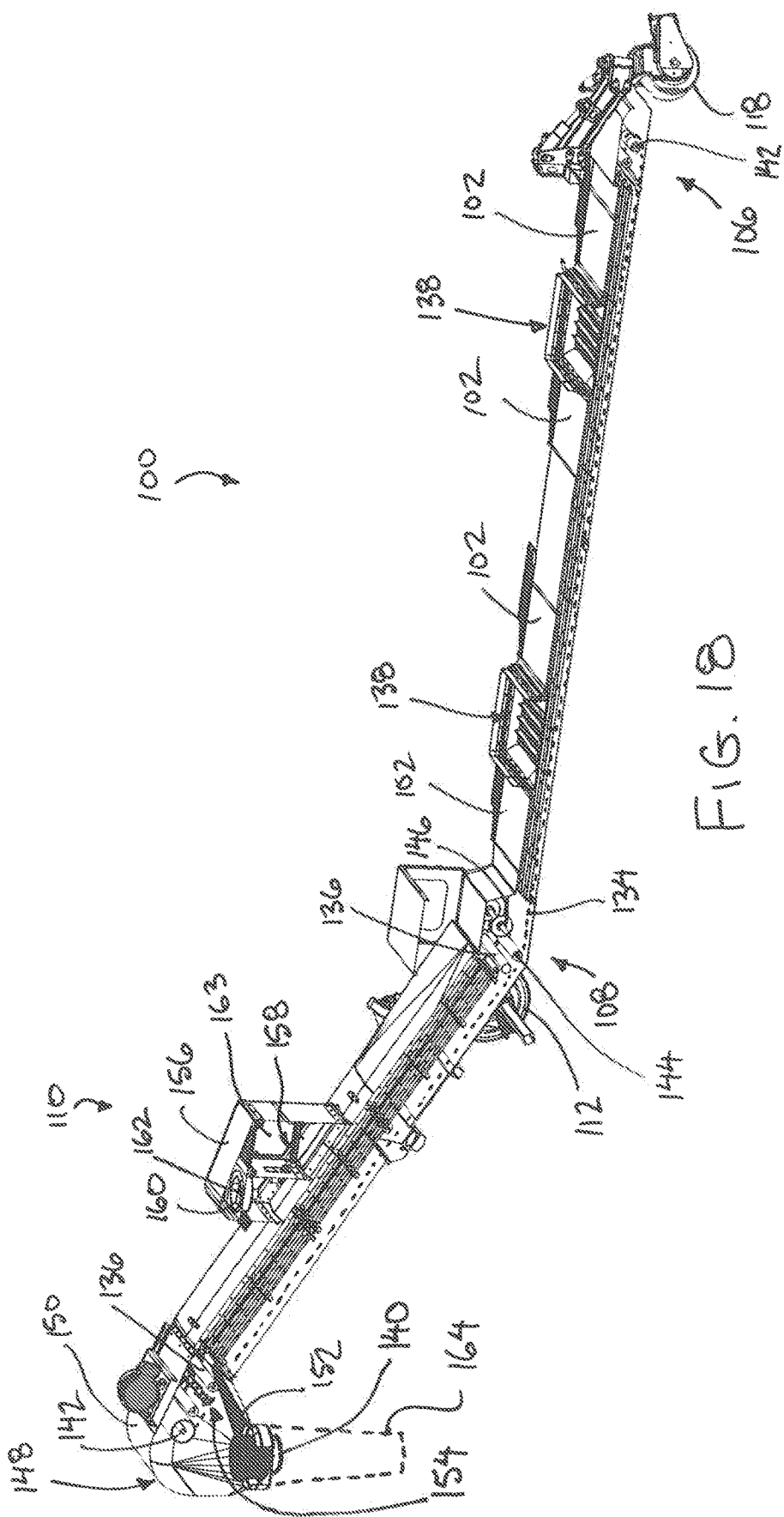
FIG. 18 is a partly section view of the drive-over unloader according to FIG. 17 with the drive wheel shown in a transport position.
Figure 19:
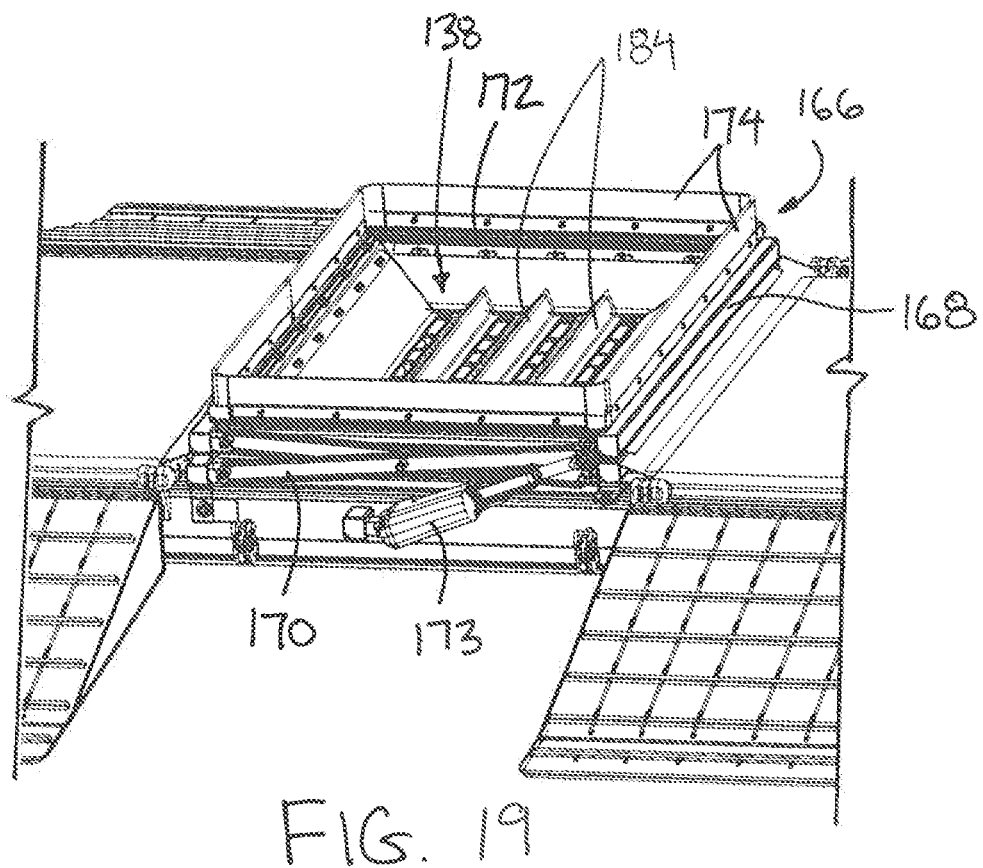
FIG. 19 is an enlarged perspective view of one of the unloader intake hoppers of the drive-over unloader according to FIG. 17 shown in a lowered position.
Figure 20:
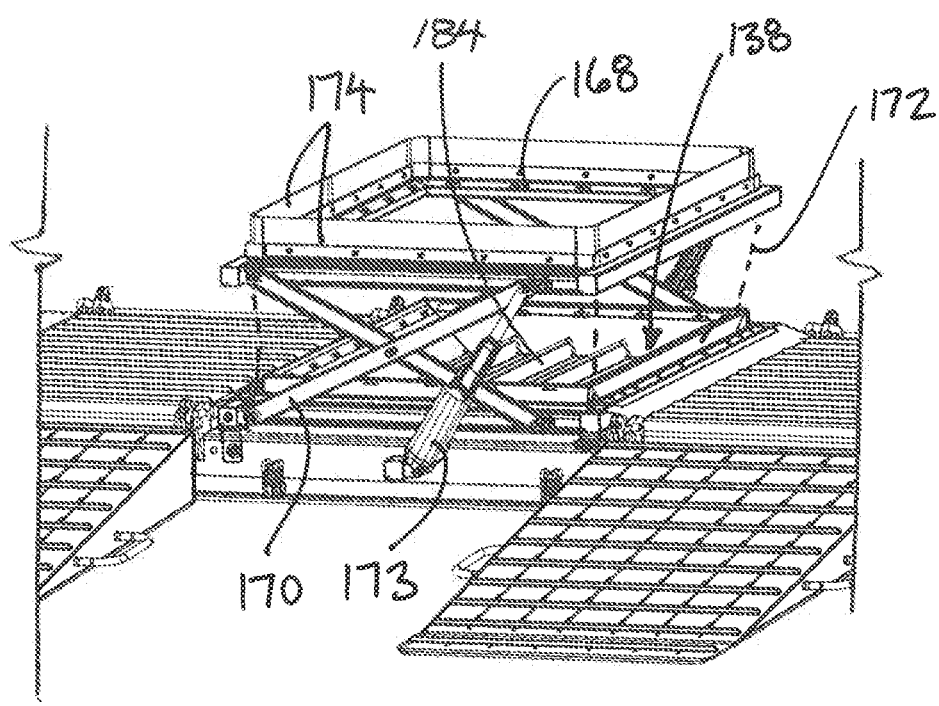
FIG. 20 is an enlarged perspective view of one of the unloader intake hoppers of the drive-over unloader according to FIG. 17 shown in a lowered position, with a flexible skirt removed for illustrative purposes.
Figure 21:
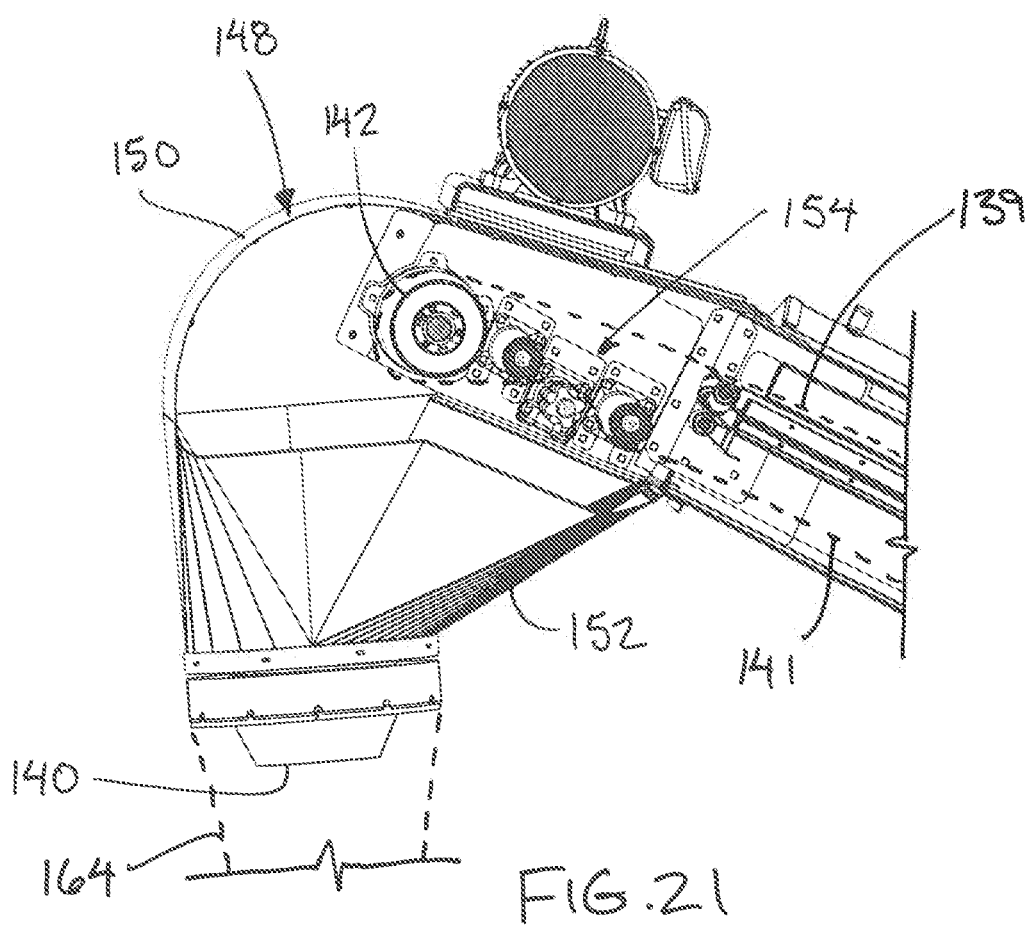
FIG. 21 is an enlarged sectional view of the discharge portion of the drive-over unloader according to FIG. 17 shown in the lowered position.
Figure 22:
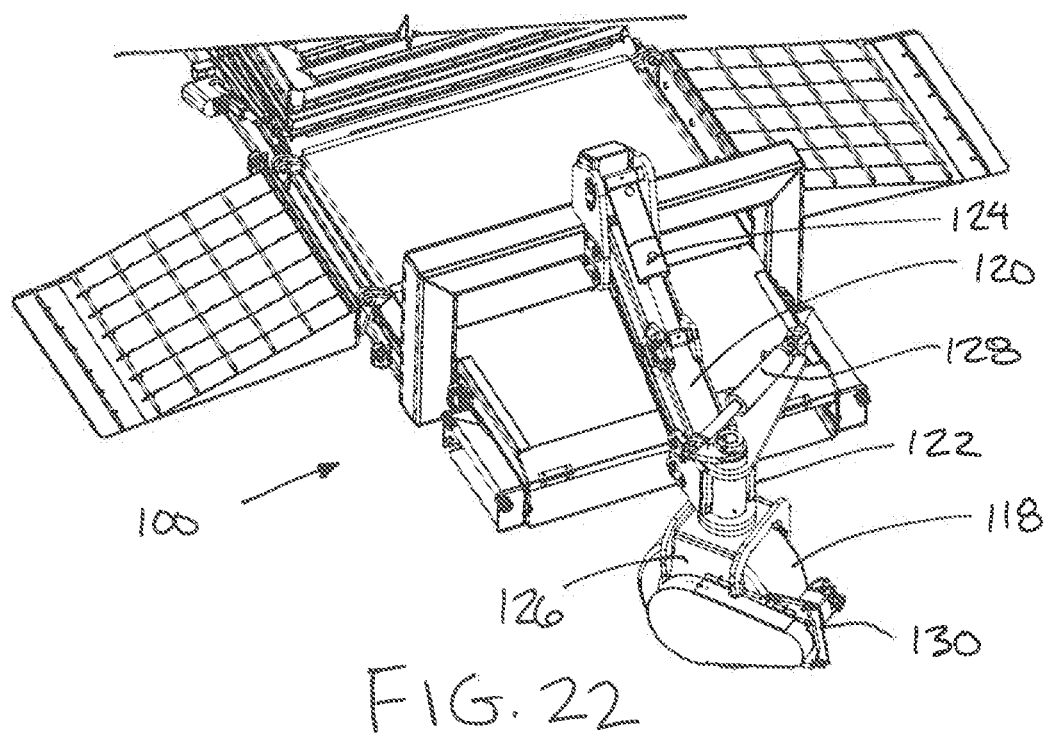
FIG. 22 is an enlarged perspective view of a drive wheel arrangement of the drive-over unloader according to FIG. 17.
Figure 23:
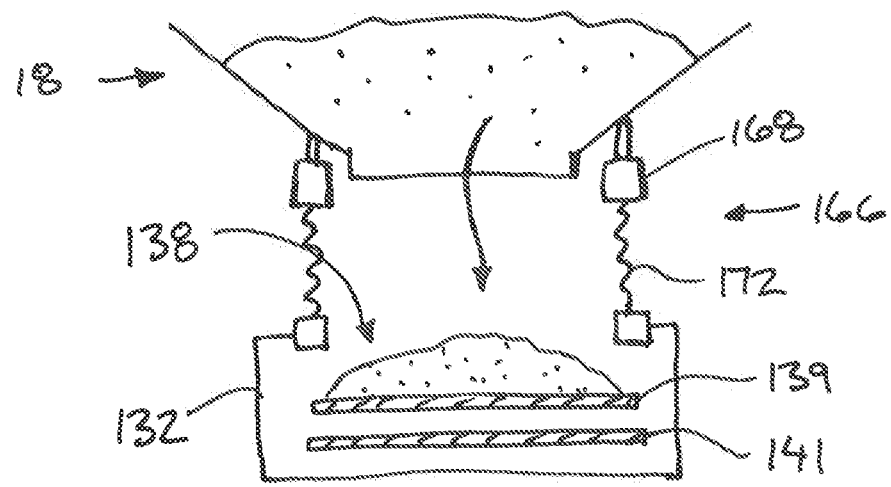
FIG. 23 is a schematic representation of a choke-fill arrangement representative of the transfer of material from the truck discharges to the unloader intake hoppers of the unloader according to FIG. 17.

Referring to the accompanying figures there is illustrated a particulate material handling system for handling flowable particulate materials, for example particulate material such as proppant for use in a hydraulic fracturing operation.

The particulate material handling system generally includes (i) a storage silo apparatus comprising one or more primary storage silo assemblies 10 each including an integral vertical conveyor 12 for loading the primary storage silo assembly and an optional secondary storage silo assembly 14 receiving material from the primary storage silo assembly 10, (ii) a drive-over truck unloader 16 to receive particulate material unloaded from trucks 18 and conveying the particulate material into each primary storage silo assembly 10, and (iii) a proppant blender unit 20 that receives material from each of the primary and secondary storage silo assemblies.

Each primary storage silo assembly 10 includes a base frame 22 defining a rigid platform comprised of a plurality of beams and interconnecting crossbars together with floor panels spanning the top and bottom sides of the frame. The rigid platform formed by the base frame 22 is arranged to be supported directly on the ground or on a suitable foundation. The base frame 22 is generally square in shape having four major side edges meeting one another at four corners which are truncated. A set of four outriggers 24 are supported at the truncated region of the four corners of the square perimeter of the base frame.

Each outrigger 24 is supported for pivotal movement about a horizontal pivot shaft between a working position in which the outrigger extends outwardly beyond the square perimeter of the base frame and a transport position in which the outrigger extends upwardly within the square perimeter of the base frame. Each outrigger is a rigid frame member pivotally connected at the inner end and supporting a foot for engaging upon the ground in the working position at the outer end. A suitable locking pin is inserted through cooperating apertures in the rigid frame member of the outrigger and a corresponding portion of the base frame to secure the outrigger in either one of the working or transport positions thereof.

The primary storage silo assembly 10 further includes a storage silo 26 supported on and extending upwardly from the base frame 22. The storage silo 26 includes a cylindrical perimeter wall 28 which is elongate in a vertical direction of height. A rigid, circular roof panel 30 encloses the top end of the cylindrical perimeter wall. A hopper bottom 32 encloses the bottom end of the cylindrical perimeter wall 28. The hopper bottom includes a conical boundary wall tapering downwardly and inwardly from the bottom end of the perimeter wall 28 to a central bottom discharge opening 34 of the hopper bottom.

A support frame is connected between the storage silo 26 and the base frame 22 for supporting the hopper bottom spaced above the upper supporting surface of the base frame 22. More particularly, the support frame comprises a set of four corner legs 36 extending vertically upward from the base frame 22 in proximity to the four corners thereof. A plurality of suitable struts and/or crossbars are connected as bracing between adjacent ones of the legs for structural stability. Each leg may extend vertically upward along an outer side of the cylindrical perimeter wall 28 along a major portion of the overall height of the storage silo while being structurally joined to the perimeter wall 28 for transferring weight of the storage silo to the legs 36.

The primary silo assembly further includes the vertical conveyor 12 integrally supported thereon in which the vertical conveyor comprises a bucket elevator of the type having an endless belt rotatable between an upper pulley wheel 38 above the storage silo and a lower pulley wheel 40 below the storage silo and a plurality of buckets affixed at spaced apart positions along the endless belt for rotation with the belt about the pulley wheels. More particularly, the vertical conveyor includes an intake housing 42 supported below the silo for locating the lower pulley wheel 40 therein while being fully contained in a lateral direction within the perimeter boundary defined by the perimeter wall 28 of the storage silo thereabove. Similarly, the vertical conveyor includes a discharge housing 44 supported above the silo for locating the upper pulley wheel 38 therein while also being fully contained in a lateral direction within the perimeter boundary defined by the perimeter wall 28 of the storage silo therebelow.

As the endless belt of the bucket elevator is rotated, a lifting run of the belt is displaced upwardly within a first duct 46 that extends through the silo between the intake housing and the discharge housing while a return run of the belt is displaced downwardly within a second duct 47 that extends through the silo between the intake housing and discharge housing separately from and parallel to the first duct 46. A pair of openings are provided at spaced apart locations in the conical wall of the hopper bottom and in the roof panel to receive two tubular casings extending through the silo, so that each tubular casing 49 defines a closed interior passage extending between a respective one of the openings in the conical wall and a respective one of the openings in the roof. The interior passages of the tubular casings 49 do not communicate with the interior of the silo and are arranged to receive the first and second ducts 46 and 47 communicating therethrough respectively at a location offset from the centrally located bottom discharge opening 34 of the hopper bottom.

The intake housing 42 includes an elevator intake hopper 48 protruding from one side of the intake housing. The intake hopper includes a boundary wall that is sloped downwardly and inwardly from an open top end of the intake hopper 48 to a feed opening 50 in the sidewall of the intake housing 42 such that any material within the intake hopper is naturally guided by gravity into the feed opening in the upright boundary wall of the intake housing. The feed opening 50 is located in proximity to the lifting run 46 of the vertical conveyor such that any material communicated into the intake hopper through the feed opening 50 collects within the intake housing 42 in a manner for collection within the buckets of the vertical conveyor as the belt is rotated for subsequent conveying of the material upwardly to the discharge housing of the conveyor. The feed opening 50 is a restricted opening between the intake hopper and the intake housing of the elevator which is sized and positioned to prevent overfilling of the vertical conveyor beyond the loading capacity. In this manner the vertical conveyor cannot be overloaded according to a choke fill arrangement of the feed opening 50 which restricts feeding of materials into the vertical conveyor at a rate which exceeds the conveying rate of the conveyor.

The discharge housing 44 includes an outlet duct 52 having an inlet opening that is located directly below a location where the buckets of the bucket elevator are inverted from the lifting run to the return run such that material discharged from the inverted buckets is deposited into the inlet opening of the outlet duct. The outlet duct 52 tapers downwardly for directing material discharged by the bucket elevator into a selected first discharge duct 54 in communication with the storage volume within the storage silo 26 or a second discharge duct 56 which communicates externally of the storage silo for discharging into the adjacent secondary silo assembly 14 as described in further detail below. In the illustrated example, the first discharge duct 54 is a straight duct positioned directly below the outlet duct 52 for receiving the material discharged through the outlet duct 52 directly into the first discharge duct 54 according to a first configuration of the discharge housing. The second discharge duct extends downwardly and laterally outwardly from an inlet offset laterally to one side of the first discharge duct at a location below the outlet duct 52 as well. The second discharge duct only receives material discharged through the outlet duct 52 according to a second configuration of the discharge housing.

The configuration of the discharge housing is controlled by a suitable gate 58 which is operable between a first position according to the first discharge configuration and a second position according to the second discharge configuration of the discharge housing. More particularly, the gate 58 comprises a panel 60 operatively connected to a pivot shaft 62 defining a lateral pivot axis enabling the panel to be pivoted between the first and second positions. In the first position, the panel 60 extends across the inlet opening of the second discharge duct 56 while being sloped downwardly and towards the first duct 54 such that any material discharged from the outlet duct towards the second discharge duct 56 is redirected by the gate panel 60 into the first duct. Likewise, in the second position, the panel 60 extends across the inlet opening of the first discharge duct 54 while being sloped downwardly and towards the second discharge duct 56 such that any material discharged from the outlet duct 52 towards the first discharge duct 54 is redirected by the gate panel 60 into the second duct. The pivot shaft 62 is supported on the walls of the discharge housing to protrude externally of the housing at one end. A suitable gate actuator 64 is operatively connected to the end of the pivot shaft externally of the discharge housing such that the gate actuator 64 can be actuated by an operator at ground level to be displaced between the first and second positions thereof as desired.

A silo discharge duct 66 is connected to the bottom of the hopper bottom of the storage silo in open communication with the bottom discharge opening 34 of the hopper bottom. The discharge duct in the illustrated embodiment has a circular cross-sectional shape and is mounted to extend downwardly and laterally outward at a slope for discharging under gravity alone into the proppant blender unit 20 as described further below.

The primary storage assembly further includes a secondary discharge duct 68 communicating through the conical boundary wall at the bottom of the silo at a location spaced above the bottom discharge opening. The secondary discharge duct extends downwardly and outwardly at a slope to an outer discharge end of the duct. The secondary discharge duct 68 is an open communication with the interior of the storage silo to receive material from the storage silo and for discharging the material under gravity alone. A suitable valve or gated structure is mounted in series with the secondary discharge duct for controlling the discharge of material therethrough. The secondary discharge duct is typically not in use when the capacity for discharging through the bottom discharge duct is sufficient and the elevation discharge of the bottom discharge duct 66 is sufficient. In some instances where discharging to downstream equipment that requires discharging under gravity from a greater elevation, the secondary discharge duct can be used in place of the bottom discharge duct 66. Alternatively, when additional discharge capacity is desired, the secondary discharge duct can be used in cooperation with the bottom discharge duct to increase the discharge capacity of the storage silo.

The primary silo assembly 10 may further includes one or more pneumatic conveying lines supported externally alongside the upright perimeter wall 28 of the silo. Each pneumatic conveying line is an elongate tube extending vertically between an inlet at a bottom end thereof and a discharge portion at the top end thereof in which the tube forms an inverted U-shape for communication through the roof panel of the silo to direct conveyed material downwardly into the silo from the top end of the pneumatic conveying line. Suitable gates are connected in series with each pneumatic conveying line for closing the passage through the tube when not in use. A suitable connection flange is provided at the inlet end for connection to pneumatic conveying equipment that directs conveyed material upwardly through the line.

A vent line 72 is similarly provided in the form of a tubular passage extending alongside the upright perimeter wall 28 of the silo similarly to the pneumatic lines 70. The vent line 72 has an upper end portion having an inverted U-shape for open communication through the roof panel of the silo and an opposing bottom end externally of the silo which is vented to the exterior.

Suitable flow sensors are provided in communication with the primary discharge duct 66 and the secondary discharge duct 68 for tracking the discharge rate of material therethrough into the downstream blender unit.

The primary silo assembly 10 is transported as a single integral structure including the base frame, the storage silo, and the vertical conveyor integrated within the storage silo. In preparation for transport, any duct extending beyond the perimeter boundary of the base frame and/or the cylindrical wall of the storage silo is disconnected and/or removed and the outriggers are displaced into the transport positions thereof. The entirety of the primary silo assembly can then be laid onto its side using a lay down trailer for subsequent transport in a horizontal configuration on the trailer. The lay down trailer is likewise used for erecting the silo into a vertical position at a work site where the silo is to be used. Appropriate ducts are connected between the primary silo assembly and adjacent equipment to execute the various functions described herein.

The secondary silo assembly 14 is configured to be substantially identical to the primary silo assembly 10, with the exception that no vertical conveyor 12 is provided on the secondary silo assembly. The roof panel 30 of the secondary silo assembly is thus only interrupted by a main inlet duct 74 which is joined in open communication with the second discharge duct 56 of an adjacent associated primary silo assembly. A second inlet duct 75 communicates through the roof panel 30 at a location diametrically opposite from the main inlet duct 74 for use as an alternative filling port to load material into the secondary silo. Both the main inlet duct 74 and the second inlet duct 75 can be used when connected to respective vertical conveyors 12 of primary silo assemblies 10 mounted at diametrically opposing sides of the secondary silo assembly 14 if desired.

The secondary silo assembly 14 is transported and erected similarly to the primary silo assembly, separately and independently of the primary silo assembly, using its own respective lay down trailer. In use, the secondary silo assembly 14 is operated in association with a corresponding primary silo assembly 10. Material for both silos is loaded into the elevator intake hopper 48 of the primary silo assembly 10. The bucket elevator defining the vertical conveyor 12 of the primary silo assembly is operated (i) in the first configuration to load material from the elevator intake hopper into the storage silo of the primary silo assembly 10 and (ii) in the second configuration to load material from the elevator intake hopper into the door silo of the secondary silo assembly 14.

The primary silo assembly 10 and the secondary silo assembly 14 can be precisely located and supported relative to one another by use of a coupling mat 200 that is coupled between the base frame 22 of the primary silo assembly 10 and the base frame 22 of the secondary silo assembly 14, while each of the silo assemblies remains directly supported on a suitable foundation or ground surface. More particularly, each base frame 22 is a rigid assembly comprised of (i) a perimeter beams 202 defining a generally polygonal perimeter shape of the base frame and (ii) a plurality of cross beams 204 spanning across the base frame between opposing sides of the base frame. In the illustrated embodiment, the perimeter shape of the base frame is a square with truncated corners defining an octagonal overall shape. The cross beams 204 in this instance extend diametrically across the base frame to define a plurality of spokes radiating out from the centre of the base frame where the cross beams are joined. A series of top plates 206 enclose the top side of the base frame between the beams and a plurality of bottom plates 208 enclose the bottom side of the base frame between the beams.

The coupling mat 200 includes a mat frame which is elongate in a longitudinal direction so as to define two long sides 210 defining a lateral width perpendicularly to the longitudinal direction between the two long sides 210. Perimeter beams extend along each of the long sides 210 and assist in defining the overall perimeter shape of the mat frame. A set of crossbars 212 are connected laterally across the width of the mat frame at longitudinally opposed ends and at intermediate locations to maintain the rigid structure of the mat frame. A top plate 217 and a bottom plate 219 enclose the top and bottom sides of the mat frame between the beams in which an overall thickness of the mat frame between the top and bottom defined by the top and bottom plates thereof is approximately equal to the overall thickness of the base frames 22 between the top and bottom defined by the top and bottom plates thereof.

The perimeter shape of the mat frame includes a central portion 214 spanning a majority of the length in the longitudinal direction where the opposing long sides 210 are parallel to one another and a pair of end portions 216 at opposing ends of the central portion where the width of the mat frame diverges towards each end of the mat frame. The resulting shape along each alongside 210 of the mat frame corresponds to a mating portion of the perimeter shape of each of the base frames 22 of the primary silo assembly 10 and the secondary silo assembly 14 between which the mat frame is received. The mat frame is abutted between the base frames of the two silos such that the width of the mat frame in the lateral direction defines the spacing between the base frames of the silos. The central portion of each long side 210 aligns with a corresponding side edge of the base frame 22 of the corresponding silo while the diverging end portions 216 match the profile of the truncated corners of the adjacent base frames, thereby locating the base frames in the longitudinal direction of the mat frame relative to one another. In this manner, one of the long sides 210 defines a first docking station 218 for receiving and precisely locating the base frame of the primary silo assembly 10 therein while the other alongside 210 defines a second docking station 220 for receiving and precisely locating the base frame of the secondary silo assembly 14 therein.

Each docking station 218 and 220 is further provided with two first connectors 222 which are mounted on the perimeter wall of the mat frame at longitudinally spaced positions along the central portion 214 in the form of male pins that protrude laterally outwardly from the mat frame. The first connectors 222 are arranged for alignment with corresponding second connectors 224 situated at spaced positions on one side edge of the base frame 22 of the corresponding silo received within the docking station. Each second connector 224 comprises a female socket that is aligned with and receives a corresponding first connector 222 therein such that the first and second connectors mate with one another for relative sliding movement therebetween in the lateral direction of the mat frame.

Each primary silo assembly 10 is provided with two connectors 224 only on one side of the base frame corresponding to the discharge direction of the discharge duct 56 of the primary silo assembly as only that side of the primary silo assembly is typically aligned with an adjacent secondary silo assembly into which it discharges.

Alternatively, each secondary silo assembly 14 is provided with a pair of connectors 224 on two opposing sides of the base frame corresponding to the location of the first inlet duct 74 and the second inlet duct 75 respectively. In this instance, either one or both of the diametrically opposed sides of the secondary silo assembly 14 with inlet ducts 74 or 75 can be aligned with and coupled by a coupling mat 200 to a respective primary silo assembly 10.

Additional support between the base frames 22 and the mat frame of the coupling mat 200 is provided by a set of intermediate outriggers 226 which are similar in configuration to the outriggers 24 on each base frame but which are instead located above the top side of the base frame 22 for overlapping onto the top side of the mat frame of the coupling mat 200 in each instance. More particularly, two intermediate outriggers 226 are provided in association with each pair of second connectors 224 on the base frames of the silo assembly. Accordingly, each primary silo assembly includes a single pair of intermediate outriggers 226 protruding from the top side of the base frame 22 in a lateral direction from the side of the base frame that corresponds to the location of the second connectors 224. Each secondary silo assembly includes a pair of the intermediate outriggers 226 protruding from the top side of the base frame in a lateral direction from the two opposing sides of the base frame respectively corresponding to the two sides that locates the second connectors 224 therein. The intermediate outriggers on the base frame of the primary silo assembly are arranged to be offset in the longitudinal direction of the coupling mat 200 relative to the intermediate outriggers protruding from the base frame of the secondary silo assembly such that the outriggers of the primary and secondary silo assemblies do not interfere with one another when overlapping the top of the coupling mat in an assembled configuration.

More particularly, each intermediate outrigger 226 includes a leg 228 which is pivotally coupled between a pair of parallel mounting plates 230 which extend upwardly from the top side of the base frame 22 of the silo assembly. A foot 232 extends laterally and perpendicularly across the end of the leg 228 and serves to lie flat against the top side of the mat frame in an assembled configuration. The leg 228 can be pivoted upwardly for transport and storage in non-protruding relation relative to the perimeter boundary of the base frame; however, in a working position the leg 228 extends laterally outward beyond the perimeter edge of the base frame for overlapping the top plate of the mat frame and for extending horizontally across the seam between the perimeter edge of the base frame 22 of the silo assembly and the mat frame abutted against the perimeter edge of the base frame. A latch pin 234 is received through cooperating apertures in the mounting plates 230 and the leg 228 to selectively retain the leg in the working position.

The coupling mat does not prevent lateral sliding movement of the silo assemblies away from one another but rather acts to provide support to prevent adjacent silos from tipping relative to one another by the interaction of the mating first and second connectors 222 and 224 together with the intermediate outriggers 226 which couple the base frame 22 of each silo assembly to the mat frame in a manner that prevents the mat frame from being lifted or twisted relative to either of the base frames in the event that one of the silo assemblies undergoes forces acting to tip the silo assembly.

Figure 25:
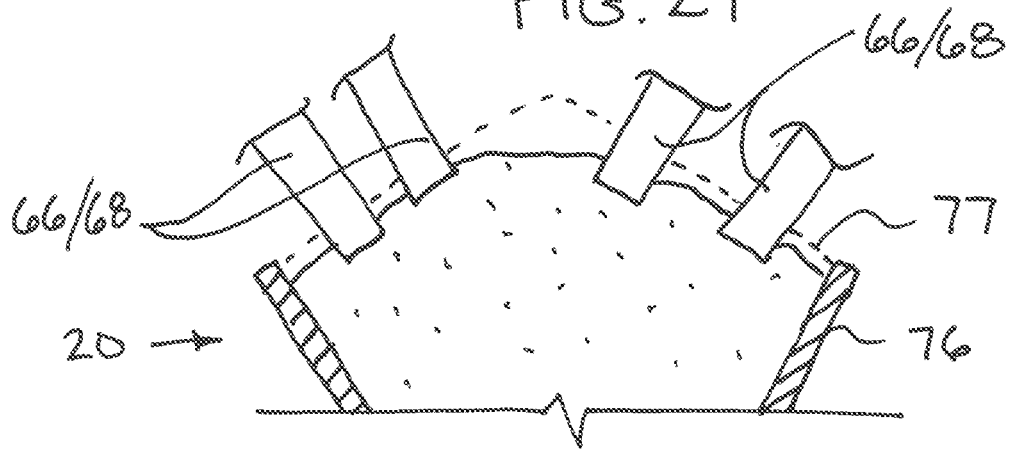
FIG. 25 is a schematic representation of a choke-fill arrangement representative of the transfer of material from the storage silo discharge of the storage silo apparatus according to FIG. 1 to the intake hopper of a blender unit as shown in FIGS. 2 and 3.

The blender unit 20 is a conventional assembly including a blender intake hopper 76 having an open top end into which proppant material can be loaded into the blender unit. Proppant can be piled into the intake hopper such that when piled at an angle of repose 77 up to a maximum fill height, a resulting upper boundary of the material defines the uppermost filling boundary of the blender intake hopper 76 as shown in FIG. 25. In use, the blender unit is positioned in proximity to the silo assemblies 10 and 14 such that the corresponding discharge ducts 66 and/or 68 of each silo assembly is directed into the open top end of the blender intake hopper 76. The open bottom end of each discharge duct is located below and within the boundaries of the upper filled boundary of the blender intake hopper while remaining in open communication with the intake hopper at a downward slope such that gravity alone allows discharge of material from the storage silos through the discharge ducts into the blender intake hopper. A resulting choke fill arrangement, as represented schematically in FIG. 25, ensures that the blender intake hopper 76 cannot be overfilled beyond the operating capacity of the blender unit due to the material within the intake hopper effectively closing off the open ends of the discharge ducts to prevent further discharge of material into the intake hopper. The collective discharge capacity of any discharge ducts that discharge into the blender intake hopper 76 is greater than the intake rate of the blender intake hopper to ensure that the blender unit is never starved of material.

Turning now to FIGS. 17 to 23, the details of the drive over unloader 16 will now be described in further detail. The unloader 16 generally includes a portable frame supported on wheels for rolling movement along the ground in a transport configuration, while being configured for being engaged upon the ground in a working configuration as described in further detail below. The portable frame generally includes a drive over portion 100 having one or more upper surface portions 102 arranged to support a portion of a vehicle driving over or being parked upon the drive over portion 100. More particularly, the drive over portion of the portable frame is elongate in a longitudinal direction and includes two sets of upper surface portions defining respective traffic lanes communicating laterally across the drive over portion 100 transversely to the longitudinal direction thereof. More particularly, each traffic lane is comprised of two upper surface portions 102 which are longitudinally spaced apart to correspond approximately to the wheelbase of a suitable transport vehicle for handling proppant materials.

A set of ramps 104 extend laterally outward from both sides of each upper surface portion 102 so that a set of four ramps is associated with each traffic lane of upper surface portions 102. The ramps are pivotally coupled to the drive over portion 100 of the portable frame between a transport position in which the ramps extend generally upward from the opposing sides of the drive over portion of the frame and a working position in which the ramps extend laterally outwardly from the opposing sides of the drive over portion of the frame such that the ramps provide suitable surfaces to guide a vehicle over the drive over portion of the frame by guiding the vehicle upwardly and onto the drive over portion of the frame at one side thereof while guiding the vehicle downwardly and off of the drive over portion of the frame at the opposing side.

The drive over portion 100 of the portable frame extends longitudinally between a first end 106 and an opposing second end 108. The portable frame of the unloader further includes a discharge portion 110 extending upwardly and longitudinally outwardly from the second end 108 of the drive over portion of the frame. The drive over portion 100 of the frame includes a set of transport wheels 112 operatively connected to the second end 108 of the drive over portion 100 adjacent to the junction of the drive over portion 100 to the discharge portion 110.

The transport wheels 112 are supported rotatably on a wheel frame 114 for rotation about a common axis of rotation oriented perpendicularly to the longitudinal direction of the portable frame. The wheel frame 114 is pivotally coupled relative to the frame of the unloader so as to vary the elevation of the transport wheels relative to the frame. A suitable lift actuator 116 is operatively connected between the wheel frame 114 and the main frame of the unloader such that extension and retraction of the lift actuator causes the wheel frame and the transport wheels supported thereon to be displaced between the transport configuration and the working position of the unloader. In the transport position, the bottoms of the transport wheels are spaced below the bottom of the drive over portion 100 of the frame such that the second end of the drive over portion of the frame and the cantilevered discharge portion 110 of the frame are carried for rolling movement along the ground by the transport wheels. In the working position, the bottoms of the transport wheels are at the same elevation or above the bottom of the drive over portion 100 of the unloader frame such that the second end of unloader frame is engaged and parked upon the ground.

The unloader 16 further includes a drive wheel 118 operatively connected to the first end of the drive over portion 100 of the unloader frame by a parallel linkage 120 allowing an elevation of the drive wheel 118 to be similarly displaced between (i) a working position spaced below the unloader frame and supporting the first end of the unloader frame for rolling movement along the ground and (ii) a transport position in which the bottom of the drive wheel is at the same elevation or above the bottom of the drive over portion 100 of the unloader frame such that the unloader frame is engaged and parked upon the ground. More particularly, the parallel linkage 120 includes an upper link and a lower link that are parallel and spaced apart from one another, while being pivotally coupled at first ends of the links on the unloader frame and being pivotally coupled at second ends of the links on an intermediate frame 122. A lift actuator 124 is operatively connected to the linkage to raise and lower the intermediate frame 122 relative to the unloader frame.

A wheel frame 126 rotatably supports the drive wheel 118 thereon while being supported on the intermediate frame 122 for steering movement relative to the intermediate frame and the unloader frame about an upright steering axis. A steering actuator 128 is operatively connected between the wheel frame 126 and the intermediate frame 122 to control the rolling orientation of the drive wheel 118 about the upright steering axis. A drive motor 130 is operatively connected between the drive wheel 118 and the wheel frame 126 to drive rotation of the drive wheel and propel the portable unloader frame relative to the ground in the transport position.

The unloader 16 further includes a conveyor housing 132 supported on both the drive over portion 100 and the discharge portion 110 of the unloader frame to define an enclosed duct extending along a full length of the unloader frame. An unloader conveyor 134 is provided in the form of an endless belt conveyor supported within the enclosed duct of the unloader frame by a plurality of guide rollers 136 for conveying material from a pair of intake openings 138 along the upper surface of the drive over portion of the unloader frame to a discharge opening 140 at the upper end of the discharge portion 110 of the unloader.

The guide rollers 136 support the belt of the conveyor so as to define (i) a first portion extending horizontally through the drive-over portion 100 of the unloader frame under each intake opening 138 such that material deposited into each intake opening is captured upon and conveyed by the unloader conveyor, and (ii) a second portion extending upwardly along the discharge portion 110 of the unloader frame to discharge material from the conveyor at the upper end of the discharge portion through the discharge opening 140. The first and second portions are continuous with one another. The endless belt defines an upper run 139 along each portion that is driven to rotate towards the discharge opening 140 and an opposing lower run 141 that is driven to return below the upper run from the discharge opening 140 towards the first end 106 of the unloader frame.

The guide rollers generally include main rollers 142 at opposing ends of the unloader to guide the transition between the upper run and the lower run of the belt. A lower intermediate roller 144 is provided at the junction of the drive-over and discharge portions of the unloader frame below which the lower run of the belt passes to guide the change in direction of the lower run of the belt from the discharge portion of the frame to the drive-over portion of the frame. Above the upper run of the belt a pair of guide wheels 146 are supported at opposing ends of a common shaft to guide the change in direction of the upper run of the belt from the drive-over portion of the frame to the discharge portion of the frame. The guide wheels are spaced apart towards opposing side edges of the belt so as not to interfere with conveyed materials centrally located on the belt.

A discharge housing 148 is supported at the upper end of the discharge portion 110 of the unloader frame and locates the discharge opening 140 of the unloader therein. The discharge housing includes an upper portion 150 surrounding the upper end of the belt conveyor and a collector portion 152 below the upper portion that defines a hopper that is open to the discharge end of the belt conveyor thereabove. The hopper of the collector portion 152 is sized to receive all material discharged from the end of the belt conveyor while tapering downwardly and inwardly towards a bottom outlet that defines the discharge opening 140 of the conveyor housing.

A beater member 154 is supported within the discharge housing 148 of the unloader at a location adjacent to the lower run of the unloader conveyor, near the discharge end of the conveyor, and above the collector portion 152. The beater member 154 comprises a shaft extending laterally across the housing, and being supported on opposing walls of the housing by suitable bearings. A plurality of lobes 156 protrude from the shaft at axially and circumferentially spaced apart locations on the shaft. The beater member 154 is positioned near guide rollers that guide the lower run of the belt of the conveyor under tension below the beater member and across the path of the rotating lobes of the beater member. In this matter, rotation of the beater member results in the lobes repeatedly impacting the lower run of the belt to shake loose any material clinging to the belt. The loosened material falls into the collector portion of the housing below for being discharged from the unloader together with the remaining conveyed material.

The unloader further includes an exhaust housing 156 supported on the top side of the discharge portion 110 of the unloader housing so as to be in open communication with the interior of the unloader housing. The exhaust housing includes a first chamber 158 supporting one or more particle filtration devices therein and a second chamber 160 supporting an exhaust fan 162 therein such that the exhaust fan draws air from the unloader housing through the filtration devices in the first chamber 158 and discharges the drawn air externally of the unloader. The operation of the exhaust fan 162 creates a negative pressure within the conveyor housing to minimize the escape of any dust arising from the handling of the material to be conveyed. The airflow from the exhaust fan is drawn through the filtration devices within the first chamber 158 to protect the exhaust fan from collected dust and ensure that the air exhausted externally is substantially free of dust. An access panel 163 is provided in the wall of the exhaust housing in alignment with the first chamber 158 for cleaning or replacing the filtration devices within the first chamber.

Figure 24:
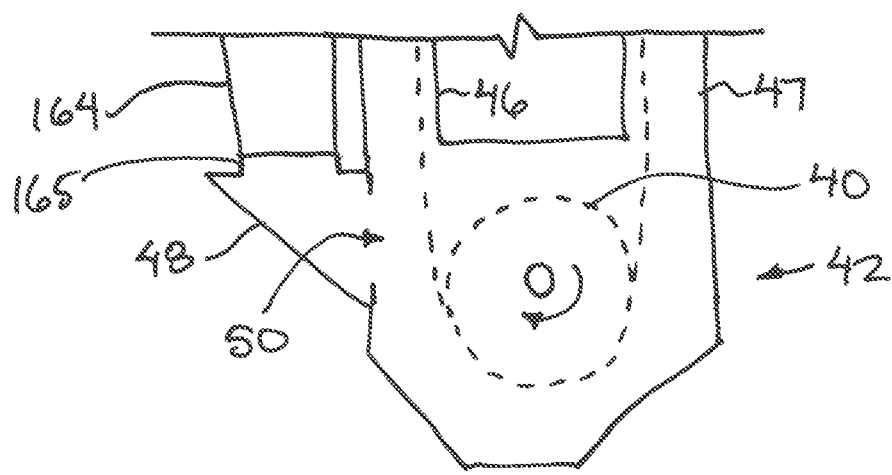
FIG. 24 is a schematic representation of a choke-fill arrangement representative of the transfer of material from the drive-over unloader according to FIG. 17 to the elevator intake hopper of the storage silo apparatus according to FIG. 1.

The unloader further includes an unloader discharge duct 164 in the form of an enclosed duct in unrestricted communication with the discharge opening 140 of the unloader. The discharge duct 164 is mounted to extend downwardly to the elevator intake hopper 48. The discharge housing 148 is sized to be received below the hopper bottom of the storage silo of the primary silo assembly such that the discharge duct 164 can openly communicate with the elevator intake hopper 48 therebelow. The discharge duct 164 from the unloader can formed a sealed connection to an inlet collar 165 as shown in FIG. 24, in which the inlet collar 165 forms the only inlet opening of the elevator intake hopper 48. In this manner, the unloader discharge duct is in communication with the intake hopper of the vertical conveyor so as to form a closed passage between the unloader and the vertical conveyor, whereby a flow of the conveyed material from the unloader to the vertical conveyor is fully enclosed.

Alternatively, when the elevator intake hopper 48 has an open top end that allows the bottom of the discharge duct to be freely suspended therein, the open bottom end of the duct 164 is arranged to be positioned below an uppermost fill boundary of the intake hopper 48 in a choke fill arrangement. More particularly, the upper fill boundary of the elevator intake hopper is defined as the upper boundary of material pile that an angle of repose within the elevator intake hopper. In this instance even when the discharge duct 164 openly communicates with the elevator intake hopper in an unrestricted manner by gravity discharge alone, the elevator intake hopper cannot be overfilled as filling of material up to the upper fill boundary of the hopper is sufficient to close off the open bottom end of the discharge duct 164 and prevent further discharge of material into the hopper. Furthermore, the rate of the unloading conveyor of the unloader can be arranged to be less than the conveying rate of the vertical conveyor of the primary silo assembly 10 to further prevent overfilling of the elevator intake hopper.

Each of the intake openings 138 for loading material into the unloader is associated with a respective lane on the drive over portion 100 of the frame so as to be located between a corresponding pair of upper surface portions 102 that are spaced apart according to the wheelbase of a vehicle for driving over the unloader. Each intake opening 138 is further associated with an unloader intake hopper 166. Each intake hopper 166 includes a rectangular collar 168 extending about the perimeter of the intake opening. The collar 168 has a rigid frame and is supported by a scissor linkage 170 to be coupled to the drive over portion of the unloader frame to be adjustable in height relative to the upper supporting surface of the unloader. A flexible skirt 172 is annular in shape and connects between the collar 168 at the top edge thereof and the conveyor housing about the perimeter of the intake opening 138 at the bottom edge thereof. The skirt 172 functions as a flexible duct as the elevation of the collar 168 is adjusted by the scissor linkage. A suitable lift actuator 173 is operatively connected between the frame and the collar to raise and lower the collar relative to the frame.

The collar defines the dimensions at the upper intake end of the intake hopper and is sized to be greater than corresponding dimensions of a belly mounted discharge outlet of a typical transport truck used for handling of proppant material. An additional flange 174 formed of flexible material stands upwardly from the top edge of the collar 168 about the full perimeter thereof. The collar 168 is adjustable in height between a lowered position in which passage of the truck over the unloader intake hopper is unobstructed by the collar and a raised position in which the collar is arranged to abut the bottom of the truck about the belly discharge outlet thereof. The flexible flange 174 enables the hopper to be engaged with the bottom side of the truck without damage to the collar or the truck. The adjustable height of the intake hoppers 166 allow a further choke fill arrangement to be provided at the transfer of material from the vehicles to the unloader 16.

Transverse bars 184 spanning across the intake opening 138 function as a grate to break up larger clumps of material while also restricting the cross-sectional area of the intake opening to limit the rate of material able to be loaded by gravity through the intake opening to a rate which does not exceed the conveying rate of the unload conveyor to further prevent overfilling the unload conveyor.

In use, the particulate material handling system can be set up at a worksite by transporting one or more primary silo assemblies 10 and one or more associated secondary silo assemblies 14 individually on respective lay down trailers. The drive over truck unloader 16 can be towed as a trailer with the transport wheels engaged upon the ground by connecting a hitch at the first end of the frame in place of the drive wheel. Alternatively, the unloader 16 can be transported on the flat deck of a respective trailer. The blender unit 20 in the illustrated embodiment is also mounted upon a trailer frame for separate transport to the worksite.

The silo assemblies are erected into a vertical orientation by the respective lay down trailers. Each secondary silo assembly 14 is positioned adjacent an associated primary silo assembly 10 such that the secondary discharge outlet of the elevator on the primary silo discharges into the top end of the secondary silo. The bottom discharge ducts from all silo assemblies are directed into the blender intake hopper using a self-regulating choke fill arrangement as described above so that the bottom discharge ducts remain in open communication with the silos for conveying material by gravity therethrough into the blender unit. The secondary discharge duct associated with each silo can be used in addition to or in place of the bottom discharge ducts as desired.

One truck unloader 16 is associated with each primary silo assembly 10 such that the discharge duct of the unloader 16 is in open communication with the elevator intake hopper in a self-regulating choke fill arrangement as described above so that the discharge of the unloader remains in open communication with the elevator intake hopper. The unloader frame is lowered relative to the wheels of the unloader to park the unloader frame upon the ground. Lowering the ramps to the working position thereof allows transport vehicles including trucks and trailers to discharge their loads into the unloader intake hoppers. Each transport vehicle is displaced along a lane of traffic laterally across the drive over portion of the unloader 16 to align the belly discharge outlet of the transport vehicle above a respective unloader intake hopper. The intake hopper can then be raised from the lowered position to engage the upper resilient flange of the elevator intake hopper with the underside of the vehicle so as to fully capture any material discharged from the vehicle while minimizing any escape of dust into the surrounding environment. Raising the unloader intake hoppers up to the discharge outlet of the transport vehicle also enables a choke fill arrangement between the vehicle and the unloader. Once the transport vehicle has been unloaded, the unloader intake hopper can be lowered to allow the vehicle to advance forwardly across the drive over portion of the unloader to align the next belly discharge outlet of the transport vehicle with the unloader intake hopper and unload the next compartment of the transport vehicle.

The unloader preferably has a capacity to convey materials being discharged simultaneously from two different transport vehicles operating in cooperation with the two different unloader intake openings respectively. Alternatively, the conveyor of the unloader may operate at the discharge capacity of a single vehicle, with the two unloader intake openings being used to alternate receiving materials from different trucks so that a continuous stream of conveyed materials can be achieved by alternating which unloader intake opening actively receives material from a corresponding truck.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A storage silo apparatus for flowable material, the apparatus comprising:
    a base frame;
    a storage silo supported above the base frame;
    a vertical conveyor mounted on the storage silo;
    the vertical conveyor being arranged to convey the flowable material from an intake hopper of the vertical conveyor below the storage silo to a discharge arrangement of the vertical conveyor; and
    the discharge arrangement of the vertical conveyor being operable in a first configuration discharging the flowable material into the storage silo and in a second configuration discharging the flowable material externally of the storage silo;
    wherein the discharge arrangement comprises (i) a discharge housing defining an outlet duct receiving material from the vertical conveyor, (ii) a first discharge duct in communication with the storage silo, (iii) a second discharge duct directed externally of the storage silo, and (iv) a discharge gate operable within the discharge housing between a first position directing the outlet duct to communicate with the first discharge duct according to the first configuration of the discharge assembly and a second position directing the outlet duct to communicate with the second discharge duct according to the second configuration of the discharge assembly;
    wherein the discharge gate is situated above the storage silo and the discharge gate is fully contained within a perimeter boundary defined by upright perimeter walls of the storage silo in the first and second configurations; and
    wherein the base frame, the storage silo, the vertical conveyor, and the discharge housing locating the discharge gate therein are all transportable together as a singular, integral structure.

2. The apparatus according to claim 1 wherein the intake hopper of the vertical conveyor is fully contained within the perimeter boundary defined by the upright perimeter walls of the storage silo.

3. A storage silo apparatus for flowable material, the apparatus comprising:
    a base frame;
    a storage silo supported above the base frame;
    a vertical conveyor mounted on the storage silo;
    the vertical conveyor being arranged to convey the flowable material from an intake hopper of the vertical conveyor below the storage silo to a discharge arrangement of the vertical conveyor;
    the discharge arrangement of the vertical conveyor being operable in a first configuration discharging the flowable material into the storage silo and in a second configuration discharging the flowable material externally of the storage silo;
    a hopper bottom forming a bottom end of the storage silo in which the hopper bottom tapers downwardly towards a bottom discharge at a bottom end of the hopper bottom through which the storage silo is arranged to be selectively discharged; and
    a secondary discharge in communication with an interior of the storage silo at a location spaced above the bottom discharge through which the storage silo is arranged to be selectively discharged.

4. A storage silo apparatus for flowable material, the apparatus comprising:
    a base frame;
    a storage silo supported above the base frame;
    a vertical conveyor mounted on the storage silo;
    the vertical conveyor being arranged to convey the flowable material from an intake hopper of the vertical conveyor below the storage silo to a discharge arrangement of the vertical conveyor, wherein the vertical conveyor comprises a bucket elevator operable within an elevator housing:
    the discharge arrangement of the vertical conveyor being operable in a first configuration discharging the flowable material into the storage silo and in a second configuration discharging the flowable material externally of the storage silo; and
    a pneumatic conveying tube extending alongside the storage silo from a pneumatic intake adjacent a bottom end of the storage silo to a pneumatic intake in communication with an interior of the storage silo adjacent a top end of the storage silo.

5. The apparatus according to claim 1 further comprising a secondary silo supported on a respective base frame, wherein the secondary silo and said storage silo are transportable independently of one another and wherein the discharge arrangement of the vertical conveyor discharges the flowable material into the secondary silo in the second configuration.

6. The apparatus according to claim 5 further comprising:
a coupling mat operatively connecting the base frame of the storage silo to the base frame of the secondary silo while each of the base frames remains engaged directly upon a supporting ground surface;
the coupling mat including (i) a first docking station releasably locating the base frame of the storage silo relative to the coupling mat and (ii) a second docking station releasably locating the base frame of the secondary silo relative to the coupling mat such that the base frame of the storage silo and the base frame of the secondary silo are spaced apart from one another.

7. The apparatus according to claim 1 in combination with a proppant blender unit having a blender intake hopper, the apparatus further comprising:
a hopper bottom forming a bottom end of the storage silo in which the hopper bottom tapers downwardly towards a bottom discharge at a bottom end of the hopper bottom through which the storage silo is arranged to be selectively discharged; and
an enclosed discharge duct in open communication with the bottom discharge;
the enclosed discharge duct extending from the bottom discharge to the blender intake hopper at a downward slope so as to be arranged to discharge material from the storage silo to the blender intake hopper through the enclosed discharge duct by gravity alone.

8. The apparatus according to claim 7 wherein a bottom end of the enclosed discharge duct is in open communication with the blender intake hopper at a location below an upper storage boundary of the blender intake hopper, in which the upper storage boundary is defined as an upper boundary of material piled at an angle of repose at a maximum fill height within the blender intake hopper.

9. The apparatus according to claim 7 further comprising:
a secondary silo supported on a respective base frame, the secondary silo including (i) a hopper bottom forming a bottom end of the secondary silo in which the hopper bottom tapers downwardly towards a bottom discharge at a bottom end of the hopper bottom through which the secondary silo is arranged to be selectively discharged and (ii) an enclosed discharge duct in open communication with the bottom discharge of the secondary silo;
the discharge arrangement of the vertical conveyor of the storage silo discharging the flowable material into the secondary silo in the second configuration; and
the a discharge capacity of the enclosed discharge ducts of the storage silo and the secondary silo collectively being greater than an intake rate of the blender intake hopper.

10. The apparatus according to claim 1 in combination with a drive-over unloader for unloading particulate material from a truck having a storage compartment and a belly discharge on the storage compartment associated therewith, the drive-over unloader comprising:
a portable frame including a drive-over portion arranged to support a portion of the truck thereon and a discharge portion which is elevated relative to the drive-over portion;
at least one unloader intake hopper supported on the drive-over portion arranged to receive materials discharged from the belly discharge of the truck; and
an unloader conveyor supported on the portable frame to conveyor material from said at least one unloader intake hopper to the discharge portion;
the discharge portion including an unloader discharge duct receiving conveyed material from the unloader conveyor, the unloader discharge duct being in communication with the intake hopper of the vertical conveyor so as to form a closed passage between the unloader and the vertical conveyor, whereby a flow of the conveyed material from the unloader to the vertical conveyor is fully enclosed.

11. The apparatus according to claim 10 wherein said at least one unloader intake hopper includes a collar defining an upper rim of the unloader intake hopper, the collar being adjustable in height relative to the portable frame between (i) a lowered position in which passage of the truck over the unloader intake hopper is unobstructed by the collar and (ii) a raised position in which the collar is arranged to abut the belly discharge of the truck.

12. The apparatus according to claim 10 further comprising:
an unloader housing fully enclosing the unloader conveyor between said at least one unloader intake hopper and the discharge portion;
an exhaust fan operatively connected to the unloader housing so as to maintain an interior of the unloader housing at a negative pressure; and
a dust collector operatively associated with the exhaust fan.

13. The apparatus according to claim 10 further comprising:
the unloader conveyor of the drive-over unloader comprising an endless belt conveyor including an upper run for conveying material thereon and a lower run;
the discharge portion of the drive-over unloader including a collector below a discharge end of the unloader conveyor arranged to receive conveyed material from the unloader conveyor; and
a beater member rotatably supported on the unloader housing so as to be arranged to repeatedly impact the lower run of the unloader conveyor at a location above the collector.

14. The apparatus according to claim 10 further comprising:
a pair of transport wheels on the portable frame so as to be arranged to support a first portion of the portable frame for rolling movement along the ground;
a drive wheel coupled to the portable frame by a linkage enabling the drive wheel to be controllably adjusted in height relative to the portable frame between a working position in which the drive wheel is raised relative to the portable frame and a transport position in which the drive wheel supports a second portion of the portable frame for rolling movement along the ground;
the drive wheel being controllably steerable relative to the linkage about an upright steering axis in the transport position; and
the drive wheel including a drive motor operatively connected thereto so as to drive rotation of the drive wheel and propel the portable frame relative to the ground in the transport position.

15. The apparatus according to claim 14 wherein the transport wheels are adjustable in height relative to the portable frame between the working position in which the transport wheels are raised relative to the portable frame and the transport position in which the transport wheels support a second portion of the portable frame for rolling movement along the ground.

\* \* \* \* \*